United States Patent
Yang

(10) Patent No.: US 12,531,990 B2
(45) Date of Patent: Jan. 20, 2026

(54) VIDEO CODING AND DECODING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Yong Yang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 135 days.

(21) Appl. No.: 18/450,471

(22) Filed: Aug. 16, 2023

(65) Prior Publication Data
US 2023/0388498 A1  Nov. 30, 2023

Related U.S. Application Data

(63) Continuation of application No. PCT/CN2022/130892, filed on Nov. 9, 2022.

(30) Foreign Application Priority Data

Jan. 27, 2022 (CN) .......................... 202210100827.4

(51) Int. Cl.
*H01L 29/94* (2006.01)
*H04N 19/124* (2014.01)
(Continued)

(52) U.S. Cl.
CPC ........... *H04N 19/124* (2014.11); *H04N 19/59* (2014.11); *H04N 19/91* (2014.11)

(58) Field of Classification Search
CPC ...... H04N 19/124; H04N 19/59; H04N 19/91; H04N 19/146; H04N 19/172; H04N 19/187; H04N 19/33; H04N 19/134
See application file for complete search history.

(56) References Cited

U.S. PATENT DOCUMENTS

| 2003/0108099 A1* | 6/2003 | Nagumo | G06T 9/20 375/E7.199 |
| 2006/0217975 A1* | 9/2006 | Sung | G10L 19/093 704/E19.03 |
| 2008/0008249 A1* | 1/2008 | Yan | H04N 19/33 375/E7.193 |

(Continued)

FOREIGN PATENT DOCUMENTS

| CN | 101110957 A | 1/2008 |
| CN | 103458241 A | 12/2013 |

(Continued)

OTHER PUBLICATIONS

The European Patent Office (EPO) The Extended European Search Report for Application No. 22923385.3 Jan. 16, 2025 11 Pages.

(Continued)

*Primary Examiner* — Joseph Suh
(74) *Attorney, Agent, or Firm* — Anova Law Group, PLLC

(57) ABSTRACT

A video coding includes: obtaining basic coding information and a basic quantization parameter corresponding to a current image in a video, and computing loss information of the current image based on the basic coding information; mapping the basic quantization parameter to obtain an initial enhanced quantization parameter; performing a bit rate computation using the initial enhanced quantization information to obtain an initial enhanced bit rate, and adjusting the initial enhanced quantization parameter when there is a difference between the initial enhanced bit rate and a preset target enhanced bit rate, to obtain a target enhanced quantization parameter; coding the loss information based on the target enhanced quantization parameter to obtain target enhanced coding information, and obtaining target coding information corresponding to the current image based on the basic coding information and the target enhanced coding information.

16 Claims, 14 Drawing Sheets

(51) Int. Cl.
*H04N 19/59* (2014.01)
*H04N 19/91* (2014.01)

(56) References Cited

U.S. PATENT DOCUMENTS

| | | | | |
|---|---|---|---|---|
| 2008/0095235 | A1* | 4/2008 | Hsiang | H04N 19/33 |
| | | | | 375/E7.092 |
| 2008/0212599 | A1* | 9/2008 | Chen | H04N 21/2662 |
| | | | | 370/252 |
| 2009/0207916 | A1* | 8/2009 | Kao | H04N 19/139 |
| | | | | 375/E7.021 |
| 2010/0061448 | A1* | 3/2010 | Zhou | H04N 19/87 |
| | | | | 375/240.03 |
| 2010/0183080 | A1 | 7/2010 | Jeon et al. | |
| 2012/0076204 | A1* | 3/2012 | Raveendran | H04N 21/631 |
| | | | | 375/E7.021 |
| 2013/0114684 | A1* | 5/2013 | Kim | H04N 19/146 |
| | | | | 375/240.03 |
| 2013/0322524 | A1* | 12/2013 | Jang | H04N 19/167 |
| | | | | 375/240.03 |
| 2014/0376617 | A1* | 12/2014 | Yang | H04N 19/187 |
| | | | | 375/240.03 |
| 2015/0110172 | A1* | 4/2015 | Ye | H04N 19/33 |
| | | | | 375/240.02 |
| 2016/0353107 | A1* | 12/2016 | Lou | H04N 19/167 |
| 2017/0094279 | A1* | 3/2017 | Piramanayagam | G09G 5/10 |
| 2018/0131967 | A1* | 5/2018 | Ye | H04N 19/33 |
| 2020/0244960 | A1* | 7/2020 | Sarwer | H04N 19/12 |
| 2025/0337932 | A1 | 10/2025 | Meardi et al. | |

FOREIGN PATENT DOCUMENTS

| | | |
|---|---|---|
| CN | 103533351 A | 1/2014 |
| CN | 103841418 A | 6/2014 |
| CN | 108040256 A | 5/2018 |
| CN | 111491168 A | 8/2020 |
| CN | 112752101 A | 5/2021 |
| CN | 113301342 A | 8/2021 |
| CN | 113473136 A | 10/2021 |
| CN | 113785580 A | 12/2021 |
| WO | 2020188230 A1 | 9/2020 |
| WO | 2021244341 A1 | 12/2021 |

OTHER PUBLICATIONS

Junhui Hou et al. "A linear dependent rate-quantization model for scalable video enhancement layer encoding." 2015 IEEE International Symposium on Circuits and Systems (ISCAS). IEEE, 2015.

Guido Meardi et al. "MPEG-5 part 2: Low complexity enhancement video coding (LCEVC): Overview and performance evaluation." Applications of Digital Image Processing XLIII 11510 (2020): 238-257.

The World Intellectual Property Organization (WIPO) International Search Report for PCT/CN2022/130892 Jan. 20, 2023 7 Pages (including translation).

China National Intellectual Property Administration (CNIPA) Office Action 1 for Application No. 202210100827.4 Dec. 3, 2025 13 Pages (including translation).

* cited by examiner

VIDEO CODING AND DECODING METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2022/130892, filed on Nov. 9, 2022, which claims priority to Chinese Patent Application No. 2022101008274, entitled "VIDEO CODING AND DECODING METHOD AND APPARATUS, COMPUTER DEVICE, AND STORAGE MEDIUM" filed with the China National Intellectual Property Administration on Jan. 27, 2022, the entire contents of both of which are incorporated herein by reference.

FIELD OF THE TECHNOLOGY

The present disclosure relates to the field of computer technologies, and in particular, to a video coding and decoding method and apparatus, a computer device, a storage medium, and a computer program product.

BACKGROUND

With the development of video coding technologies, a low complexity enhancement video coding (LCEVC, a new MPEG video codec currently standardized as part 2 of MPEG-5) technology has emerged. LCEVC uses a conventional video codec as a basic encoder for lower resolutions, and combines a decoded low resolution video with at most two residual enhancer layers coded with a dedicated low complexity coding tool to reconstruct a full resolution video. At present, when a video is coded by using the LCEVC technology, a preset bit rate is usually used for coding. However, in the coding process, the bandwidth or storage space required for network transmission cannot be controlled, and the use of the preset bit rate for coding may lead to low video coding quality.

SUMMARY

For the foregoing technical problems, it is necessary to provide a video coding and decoding method and apparatus, a computer device, a computer-readable storage medium, and a computer program product, which can improve video coding quality.

In a first aspect, the present disclosure provides a video coding method. The method includes: obtaining basic coding information and a basic quantization parameter corresponding to a current image in a video, reconstructing the basic coding information to obtain a reconstructed image, and computing a loss between the reconstructed image and the current image to obtain loss information; performing initial enhanced quantization mapping on the basic quantization parameter to obtain an initial enhanced quantization parameter, and quantifying the loss information by using the initial enhanced quantization parameter to obtain initial enhanced quantization information; performing a bit rate computation based on the initial enhanced quantization information to obtain an initial enhanced bit rate corresponding to the current image, and adjusting the initial enhanced quantization parameter when there is a difference between the initial enhanced bit rate and a preset target enhanced bit rate, to obtain a target enhanced quantization parameter; and coding the loss information based on the target enhanced quantization parameter to obtain target enhanced coding information, and obtaining target coding information corresponding to the current image based on the basic coding information and the target enhanced coding information.

In a second aspect, the present disclosure further provides a video coding apparatus. The apparatus includes: a loss obtaining module, configured to obtain basic coding information and a basic quantization parameter corresponding to a current image in a video, reconstruct the basic coding information to obtain a reconstructed image, and compute a loss between the reconstructed image and the current image to obtain loss information; an initial quantization obtaining module, configured to perform initial enhanced quantization mapping on the basic quantization parameter to obtain an initial enhanced quantization parameter, and quantify the loss information by using the initial enhanced quantization parameter to obtain initial enhanced quantization information; a target quantization obtaining module, configured to perform a bit rate computation based on the initial enhanced quantization information to obtain an initial enhanced bit rate corresponding to the current image, and adjust the initial enhanced quantization parameter when there is a difference between the initial enhanced bit rate and a preset target enhanced bit rate, to obtain a target enhanced quantization parameter; and a coding module, configured to code the loss information based on the target enhanced quantization parameter to obtain target enhanced coding information, and obtain target coding information corresponding to the current image based on the basic coding information and the target enhanced coding information.

In a third aspect, the present disclosure further provides a computer device. The computer device includes at least one memory and at least one processor, the memory storing a computer program, and the at least one processor implementing the following steps when executing the computer program: obtaining basic coding information and a basic quantization parameter corresponding to a current image in a video, reconstructing the basic coding information to obtain a reconstructed image, and computing a loss between the reconstructed image and the current image to obtain loss information; performing initial enhanced quantization mapping on the basic quantization parameter to obtain an initial enhanced quantization parameter, and quantifying the loss information by using the initial enhanced quantization parameter to obtain initial enhanced quantization information; performing a bit rate computation based on the initial enhanced quantization information to obtain an initial enhanced bit rate corresponding to the current image, and adjusting the initial enhanced quantization parameter when there is a difference between the initial enhanced bit rate and a preset target enhanced bit rate, to obtain a target enhanced quantization parameter; and coding the loss information based on the target enhanced quantization parameter to obtain target enhanced coding information, and obtaining target coding information corresponding to the current image based on the basic coding information and the target enhanced coding information.

In a fourth aspect, the present disclosure further provides a non-transitory computer-readable storage medium. The computer-readable storage medium stores a computer program that, when executed by at least one processor, causing the at least one processor to implement the following steps: obtaining basic coding information and a basic quantization parameter corresponding to a current image in a video, reconstructing the basic coding information to obtain a reconstructed image, and computing a loss between the reconstructed image and the current image to obtain loss information; performing initial enhanced quantization mapping on the basic quantization parameter to obtain an initial enhanced quantization parameter, and quantifying the loss information by using the initial enhanced quantization parameter to obtain initial enhanced quantization information; performing a bit rate computation based on the initial enhanced quantization information to obtain an initial enhanced bit rate corresponding to the current image, and adjusting the initial enhanced quantization parameter when there is a difference between the initial enhanced bit rate and a preset target enhanced bit rate, to obtain a target enhanced quantization parameter; and coding the loss information based on the target enhanced quantization parameter to obtain target enhanced coding information, and obtaining target coding information corresponding to the current image based on the basic coding information and the target enhanced coding information.

In the foregoing video coding method and apparatus, computer device, storage medium, and computer program product, basic coding information and a basic quantization parameter corresponding to a current image in a video are obtained, the basic coding information is reconstructed to obtain a reconstructed image, and a loss between the reconstructed image and the current image is computed to obtain loss information; initial enhanced quantization mapping is performed on the basic quantization parameter to obtain an initial enhanced quantization parameter, and the loss information is quantified by using the initial enhanced quantization parameter to obtain initial enhanced quantization information; a bit rate computation is performed based on the initial enhanced quantization information to obtain an initial enhanced bit rate corresponding to the current image, and the initial enhanced quantization parameter is adjusted when there is a difference between the initial enhanced bit rate and a preset target enhanced bit rate, to obtain a target enhanced quantization parameter, so as to adjust the enhanced quantization parameter; then, the loss information is coded based on the target enhanced quantization parameter to obtain target enhanced coding information, thereby improving accuracy of the obtained target enhanced coding information; and finally, target coding information corresponding to the current image is obtained based on the basic coding information and the target enhanced coding information, thereby improving accuracy of the obtained target coding information, that is, improving video coding quality. In addition, the initial enhanced quantization parameter is adjusted when there is the difference between the initial enhanced bit rate and the preset target enhanced bit rate, and then coding is performed based on the target enhanced quantization parameter, whereby a video coding bit rate may be accurately controlled, direct use of the preset bit rate for coding may be avoided, and the video coding quality may be improved accordingly.

In a fifth aspect, the present disclosure provides a video decoding method. The method includes: obtaining target coding information corresponding to a current coded image in a video, the target coding information including basic coding information and target enhanced coding information, where the basic coding information is obtained by coding the current coded image using a basic quantization parameter, the target enhanced coding information is obtained by coding loss information based on a target enhanced quantization parameter, the loss information is obtained by reconstructing the basic coding information to obtain a reconstructed image and computing a loss between the reconstructed image and a current image, the target enhanced quantization parameter is obtained by adjusting an initial enhanced quantization parameter when there is a difference between an initial enhanced bit rate and a preset target enhanced bit rate, and the initial enhanced bit rate is obtained by performing initial enhanced quantization mapping on the basic quantization parameter to obtain the initial enhanced quantization parameter, quantifying the loss information by using the initial enhanced quantization parameter to obtain initial enhanced quantization information, and performing a bit rate computation based on the initial enhanced quantization information; performing basic decoding on the basic coding information to obtain a basic decoded image, and performing enhanced decoding on the target enhanced coding information to obtain an enhanced decoded image; and fusing the basic decoded image and the enhanced decoded image to obtain the current coded image in the video.

In a sixth aspect, the present disclosure further provides a video decoding apparatus. The apparatus includes: a coding obtaining module, configured to obtain target coding information corresponding to a current coded image in a video, the target coding information including basic coding information and target enhanced coding information, where the basic coding information is obtained by coding the current coded image using a basic quantization parameter, the target enhanced coding information is obtained by coding loss information based on a target enhanced quantization parameter, the loss information is obtained by reconstructing the basic coding information to obtain a reconstructed image and computing a loss between the reconstructed image and a current image, the target enhanced quantization parameter is obtained by adjusting an initial enhanced quantization parameter when there is a difference between an initial enhanced bit rate and a preset target enhanced bit rate, and the initial enhanced bit rate is obtained by performing initial enhanced quantization mapping on the basic quantization parameter to obtain the initial enhanced quantization parameter, quantifying the loss information by using the initial enhanced quantization parameter to obtain initial enhanced quantization information, and performing a bit rate computation based on the initial enhanced quantization information; a decoding module, configured to perform basic decoding on the basic coding information to obtain a basic decoded image, and perform enhanced decoding on the target enhanced coding information to obtain an enhanced decoded image; and a fusion module, configured to fuse the basic decoded image and the enhanced decoded image to obtain the current coded image in the video.

In a seventh aspect, the present disclosure further provides a computer device. The computer device includes a memory and a processor, the memory storing a computer program, and the processor implementing the following steps when executing the computer program: obtaining target coding information corresponding to a current coded image in a video, the target coding information including basic coding information and target enhanced coding information, where the basic coding information is obtained by coding the current coded image using a basic quantization parameter, the target enhanced coding information is obtained by coding loss information based on a target enhanced quantization parameter, the loss information is obtained by reconstructing the basic coding information to obtain a reconstructed image and computing a loss between the reconstructed image and a current image, the target enhanced quantization parameter is obtained by adjusting an initial enhanced quantization parameter when there is a difference between an initial enhanced bit rate and a preset target enhanced bit rate, and the initial enhanced bit rate is obtained by performing initial enhanced quantization mapping on the basic quantization parameter to obtain the initial enhanced quantization parameter, quantifying the loss information by using the initial enhanced quantization parameter to obtain initial enhanced quantization information, and performing a bit rate computation based on the initial enhanced quantization information; performing basic decoding on the basic coding information to obtain a basic decoded image, and performing enhanced decoding on the target enhanced coding information to obtain an enhanced decoded image; and fusing the basic decoded image and the enhanced decoded image to obtain the current coded image in the video.

In an eighth aspect, the present disclosure further provides a non-transitory computer-readable storage medium. The computer-readable storage medium stores a computer program that, when executed by a processor, implements the following steps: obtaining target coding information corresponding to a current coded image in a video, the target coding information including basic coding information and target enhanced coding information, where the basic coding information is obtained by coding the current coded image using a basic quantization parameter, the target enhanced coding information is obtained by coding loss information based on a target enhanced quantization parameter, the loss information is obtained by reconstructing the basic coding information to obtain a reconstructed image and computing a loss between the reconstructed image and a current image, the target enhanced quantization parameter is obtained by adjusting an initial enhanced quantization parameter when there is a difference between an initial enhanced bit rate and a preset target enhanced bit rate, and the initial enhanced bit rate is obtained by performing initial enhanced quantization mapping on the basic quantization parameter to obtain the initial enhanced quantization parameter, quantifying the loss information by using the initial enhanced quantization parameter to obtain initial enhanced quantization information, and performing a bit rate computation based on the initial enhanced quantization information; performing basic decoding on the basic coding information to obtain a basic decoded image, and performing enhanced decoding on the target enhanced coding information to obtain an enhanced decoded image; and fusing the basic decoded image and the enhanced decoded image to obtain the current coded image in the video.

In the foregoing video coding method and apparatus, computer device, storage medium, and computer program product, the adjusted target enhanced quantization parameter is coded to obtain target enhanced coding information, which improves accuracy of the obtained target enhanced coding information, thereby improving accuracy of the obtained target coding information. Then, the basic coding information and the target enhanced coding information are decoded and fused to obtain the current coded image in the video, thereby improving accuracy of the obtained current coded image, namely, ensuring video decoding quality.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure.

DESCRIPTION OF EMBODIMENTS

To make the objectives, technical solutions, and advantages of the present disclosure clearer, the following further describes the present disclosure in detail with reference to the accompanying drawings and the embodiments. It is to be understood that the specific embodiments described herein are only used for explaining the present disclosure, and are not used for limiting the present disclosure.

Figure 1:
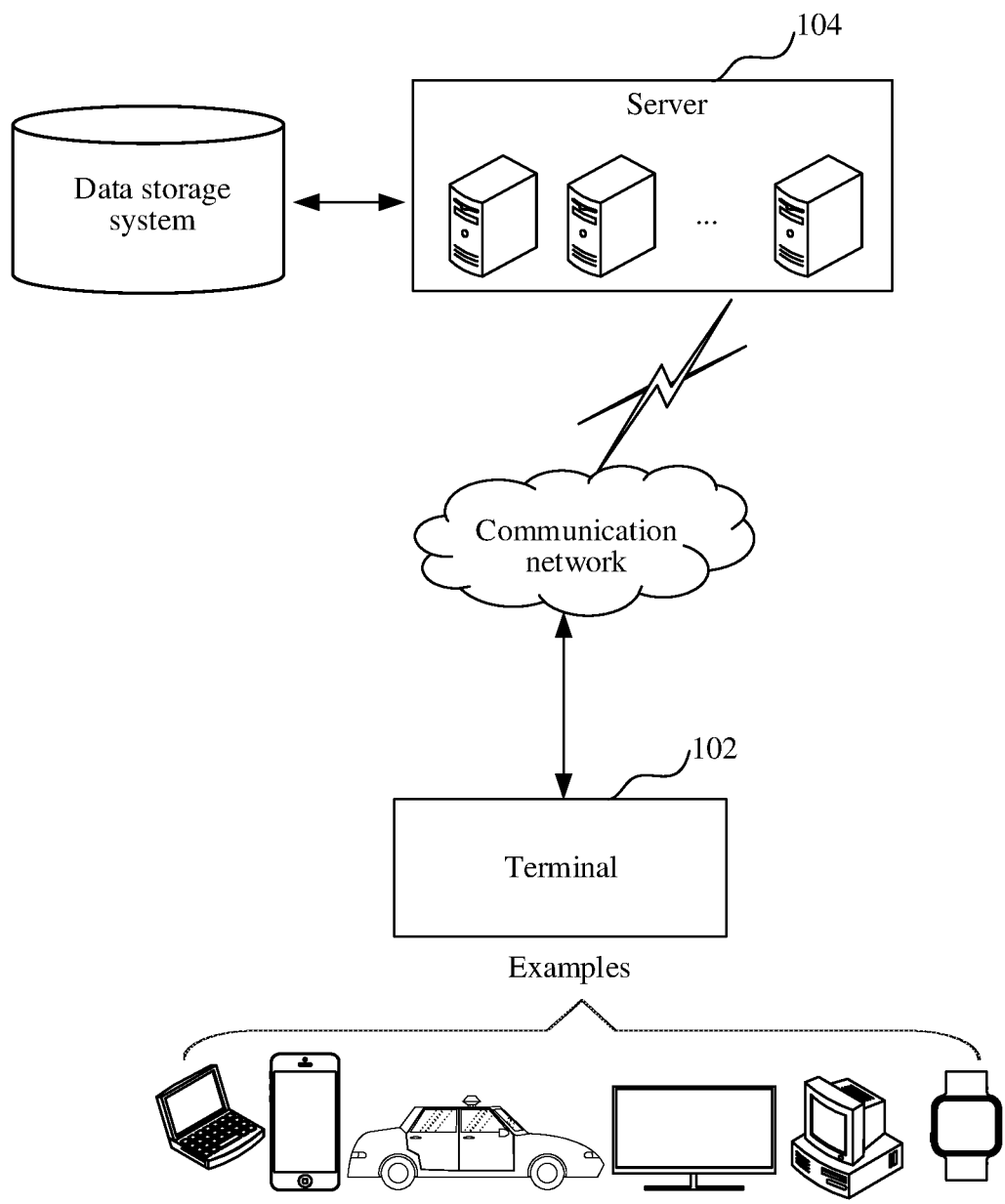
FIG. 1 is a diagram of an application environment of a video coding method in an embodiment.

A video coding method provided in an embodiment of the present disclosure may be applied to an application environment shown in FIG. 1. A terminal 102 communicates with a server 104 through a network. A data storage system may store data that the server 104 needs to process. The data storage system may be integrated on the server 104, or placed on a cloud or another network server. The terminal 102 obtains basic coding information and a basic quantization parameter corresponding to a current to-be-coded image in a video, reconstructs the basic coding information to obtain a reconstructed image, and computes a loss between the reconstructed image and the current to-be-coded image to obtain loss information; the terminal 102 performs initial enhanced quantization mapping on the basic quantization parameter to obtain an initial enhanced quantization parameter, and quantifies the loss information by using the initial enhanced quantization parameter to obtain initial enhanced quantization information; the terminal 102 computes a bit rate based on the initial enhanced quantization information to obtain an initial enhanced bit rate corresponding to the current to-be-coded image, and adjusts the initial enhanced quantization parameter when there is a difference between the initial enhanced bit rate and a preset target enhanced bit rate, to obtain a target enhanced quantization parameter; and the terminal 102 codes the loss information based on the target enhanced quantization parameter to obtain target enhanced coding information, and obtains target coding information corresponding to the current to-be-coded image based on the basic coding information and the target enhanced coding information, the terminal 102 may send the obtained target coding information to the server 104, and the server 104 saves the target coding information in the data storage system. The terminal 102 may be but is not limited to various personal computers, notebook computers, smart phones, tablet computers, Internet of things devices, and portable wearable devices, and the Internet of things devices may be smart speakers, smart televisions, smart air conditioners, smart vehicle-mounted devices, and the like. The portable wearable devices may be smart watches, smart wristbands, headset devices, and the like. The server 104 may be an independent physical server, or may be a server cluster or distributed system including a plurality of physical servers, or may be a cloud server providing basic cloud computing services such as cloud services, cloud databases, cloud computation, cloud functions, cloud storage, network services, cloud communication, middleware services, domain name services, security services, CDN, big data, and artificial intelligence platforms. The terminal may be a smart phone, a tablet computer, a notebook computer, a desktop computer, a smart speaker, a smart watch, or the like, but is not limited thereto. The terminal and the server may be directly or indirectly connected through wired or wireless communication, which is not limited here in the present disclosure.

Figure 2:
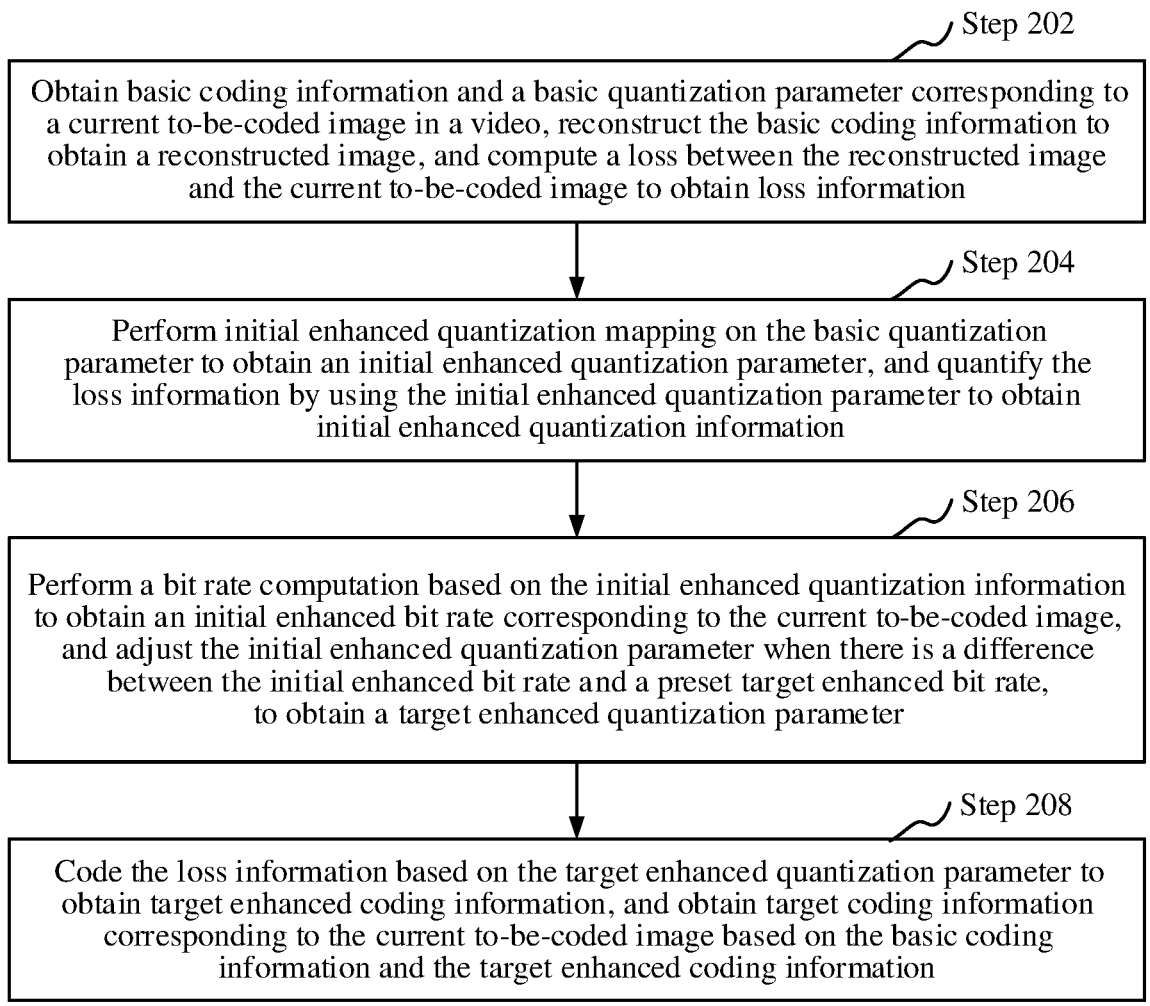
FIG. 2 is a schematic flowchart of a video coding method in an embodiment.

In an embodiment, as shown in FIG. 2, a video coding method is provided. The method is applied to the terminal in FIG. 1 as an example for description. It may be understood that the method may alternatively be applied to a server, or applied to a system including a terminal and a server and implemented through interaction between the terminal and the server. In this embodiment, the following steps are included:

Step 202: Obtain basic coding information and a basic quantization parameter corresponding to a current to-be-coded image in a video, reconstruct the basic coding information to obtain a reconstructed image, and compute a loss between the reconstructed image and the current to-be-coded image to obtain loss information.

The current to-be-coded image refers to an image that currently needs to be coded. The basic coding information refers to a bitstream obtained by coding through a base layer in an LCEVC encoder, and the base layer is coded by using an existing encoder. The basic quantization parameter refers to a quantization parameter when the base layer performs coding. The reconstructed image refers to an image obtained after decoding the basic coding information. The loss information is used for representing an error between the decoded reconstructed image and the current to-be-coded image, and may be expressed in a form of a residual matrix.

In some embodiments, the terminal may first code the current to-be-coded image in the video through the base layer to obtain the output basic coding information and the basic quantization parameter. Then, the terminal reconstructs the basic coding information to obtain the reconstructed image, and computes the loss between the reconstructed image and the current to-be-coded image to obtain the loss information. In an embodiment, the reconstructed image may be up-sampled to obtain an up-sampled image, and then a loss between the up-sampled image and the current to-be-coded image may be computed to obtain the loss information. In an embodiment, the terminal may alternatively directly obtain, from an internal memory, the basic coding information and the basic quantization parameter corresponding to the current to-be-coded image in the video. In one example embodiment, when the terminal collects the video, the terminal performs down-sampling two times on the current to-be-coded image in the video to obtain small-sized video images, and then codes the small-sized video images through the base layer to obtain the basic coding information. Then, the terminal performs up-sampling two times on the reconstructed image to obtain two up-sampled images, and computes residuals between the two up-sampled images and the corresponding down-sampled images to obtain the loss information of the two times of up-sampling and down-sampling.

Step 204: Perform initial enhanced quantization mapping on the basic quantization parameter to obtain an initial enhanced quantization parameter, and quantify the loss information by using the initial enhanced quantization parameter to obtain initial enhanced quantization information.

The initial enhanced quantization parameter refers to an initial quantization parameter used during enhanced coding, the initial enhanced quantization parameter is determined based on the basic quantization parameter, and the enhanced coding refers to coding on an enhancement layer of the LCEVC encoder. The initial enhanced quantization information refers to a quantization matrix obtained by quantifying the loss information.

In some embodiments, the terminal maps the basic quantization parameter to the initial enhanced quantization parameter according to a preset mapping relationship. Then, the terminal may first transform the loss information to obtain transformed information, and quantify the transformed information by using the initial enhanced quantization parameter to obtain the initial enhanced quantization information.

Step 206: Perform a bit rate computation based on the initial enhanced quantization information to obtain an initial enhanced bit rate corresponding to the current to-be-coded image, and adjust the initial enhanced quantization parameter when there is a difference between the initial enhanced bit rate and a preset target enhanced bit rate, to obtain a target enhanced quantization parameter.

The initial enhanced bit rate refers to an initial bit rate actually used during enhanced coding, and the preset target enhanced bit rate refers to a preset bit rate used during the enhanced coding. The target enhanced quantization parameter refers to an adjusted quantization parameter used during the enhanced coding.

In some embodiments, the terminal computes a coding entropy by using the initial enhanced quantization information, and then computes the initial enhanced bit rate corresponding to the current to-be-coded image according to a preset linear mapping relationship. Then, the terminal determines whether the initial enhanced bit rate is the same as the preset target enhanced bit rate. If the initial enhanced bit rate is not the same as the preset target enhanced bit rate, it indicates a difference between the initial enhanced bit rate and the preset target enhanced bit rate. If the initial enhanced bit rate is used for enhanced coding, the coding quality may be reduced. Therefore, the terminal adjusts the initial enhanced quantization parameter to obtain the adjusted target enhanced quantization parameter.

Step 208: Code the loss information based on the target enhanced quantization parameter to obtain target enhanced coding information, and obtain target coding information corresponding to the current to-be-coded image based on the basic coding information and the target enhanced coding information.

The target enhanced coding information refers to a bitstream obtained after enhancement layer coding. The target coding information refers to a bitstream obtained when the coding of the current to-be-coded image is completed.

In some embodiments, the terminal first transforms the loss information to obtain transformed information, then quantifies the transformed information by using the target enhanced quantization parameter to obtain quantization information, performs entropy coding on the quantization information to obtain the target enhanced coding information, and obtains the target coding information corresponding to the current to-be-coded image based on the basic coding information and the target enhanced coding information.

In the foregoing video coding method, basic coding information and a basic quantization parameter corresponding to a current to-be-coded image in a video are obtained, the basic coding information is reconstructed to obtain a reconstructed image, and a loss between the reconstructed image and the current to-be-coded image is computed to obtain loss information; initial enhanced quantization mapping is performed on the basic quantization parameter to obtain an initial enhanced quantization parameter, and the loss information is quantified by using the initial enhanced quantization parameter to obtain initial enhanced quantization information; a bit rate computation is performed based on the initial enhanced quantization information to obtain an initial enhanced bit rate corresponding to the current to-be-coded image, and the initial enhanced quantization parameter is adjusted when there is a difference between the initial enhanced bit rate and a preset target enhanced bit rate, to obtain a target enhanced quantization parameter, so as to adjust the enhanced quantization parameter; then, the loss information is coded based on the target enhanced quantization parameter to obtain target enhanced coding information, thereby improving accuracy of the obtained target enhanced coding information; and finally, target coding information corresponding to the current to-be-coded image is obtained based on the basic coding information and the target enhanced coding information, thereby improving accuracy of the obtained target coding information, that is, improving video coding quality. In addition, the initial enhanced quantization parameter is adjusted when there is the difference between the initial enhanced bit rate and the preset target enhanced bit rate, and then coding is performed based on the target enhanced quantization parameter, whereby a video coding bit rate may be accurately controlled, direct use of the preset bit rate for coding may be avoided, and the video coding quality may be improved accordingly.

Figure 3:
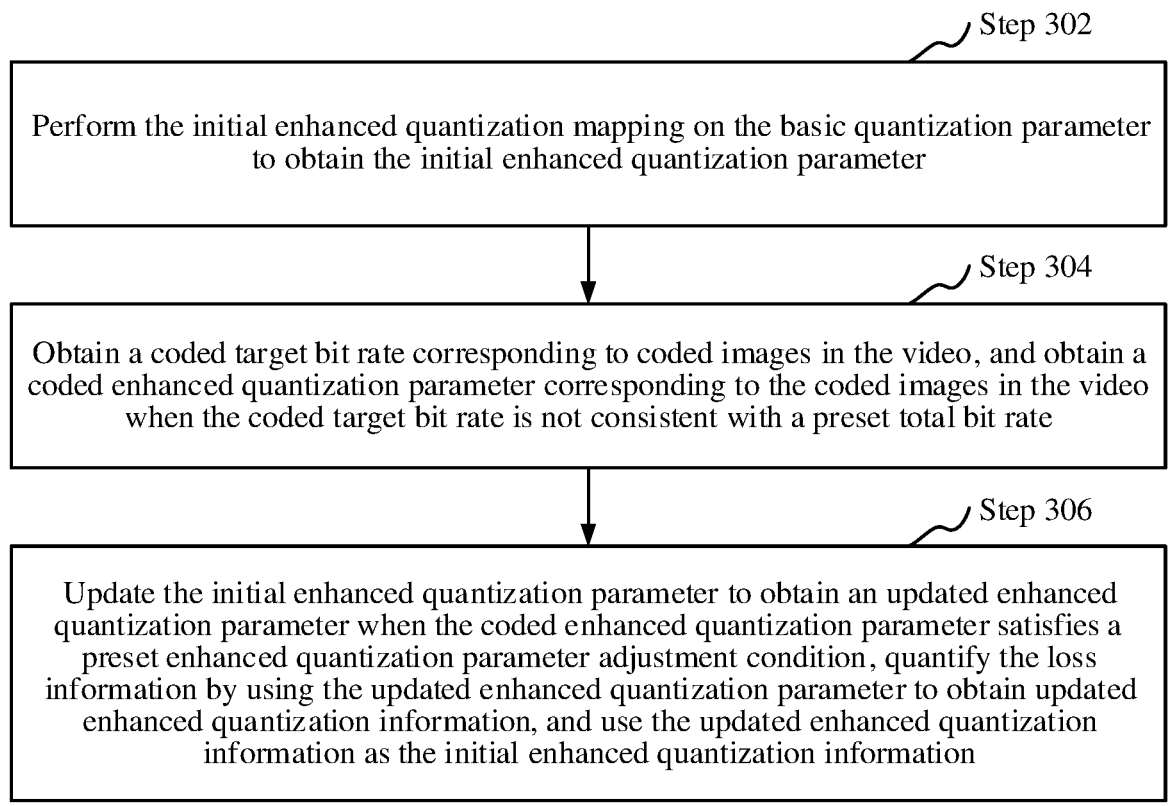
FIG. 3 is a schematic flowchart of obtaining updated enhanced quantization information in an embodiment.

In an embodiment, as shown in FIG. 3, step 204, namely, performing initial enhanced quantization mapping on the basic quantization parameter to obtain an initial enhanced quantization parameter, and quantifying the loss information by using the initial enhanced quantization parameter to obtain initial enhanced quantization information, includes:

Step 302: Perform the initial enhanced quantization mapping on the basic quantization parameter to obtain the initial enhanced quantization parameter.

Step 304: Obtain a coded target bit rate corresponding to coded images in the video, and obtain a coded enhanced quantization parameter corresponding to the coded images in the video when the coded target bit rate is not the same as a preset total bit rate.

The coded images refer to images that have been coded in the video. The coded target bit rate refers to a total bit rate actually used during coding of the coded images. The preset total bit rate refers to a preset total bit rate used for coding. The preset total bit rate may be allocated to obtain a preset basic bit rate used by the base layer and a preset enhanced bit rate used by the enhancement layer. The coded enhanced quantization parameter refers to a quantization parameter actually used during coding of the coded images on the enhancement layer.

In some embodiments, the terminal performs the initial enhanced quantization mapping on the basic quantization parameter to obtain the initial enhanced quantization parameter. Then, the terminal obtains the coded target bit rate corresponding to the coded images in the video. For example, the terminal may obtain the coded target bit rate corresponding to all the coded images from a time point of beginning coding to a time point corresponding to the current to-be-coded image. Alternatively, the coded target bit rate corresponding to the current coded video may be computed when a quantity of images in the video have been coded. Afterwards, the terminal determines whether the coded target bit rate is the same as the preset total bit rate, and obtains the coded enhanced quantization parameter corresponding to the coded images in the video when the coded target bit rate is not the same as the preset total bit rate. When the coded target bit rate is the same as the preset total bit rate, enhanced coding is directly performed on the current to-be-coded image to obtain a bitstream output by the base layer and a bitstream output by the enhancement layer that correspond to the current to-be-coded image.

Step 306: Update the initial enhanced quantization parameter to obtain an updated enhanced quantization parameter when the coded enhanced quantization parameter satisfies a preset enhanced quantization parameter adjustment condition, and quantify the loss information by using the updated enhanced quantization parameter to obtain updated enhanced quantization information.

The preset enhanced quantization parameter adjustment condition refers to a preset condition that needs to update and adjust the initial enhanced quantization parameter. The preset enhanced quantization parameter adjustment condition includes that the coded enhanced quantization parameter is a preset minimum value continuously for a preset number of times, for example, N times, where N may be set according to a demand. The preset enhanced quantization parameter adjustment condition may alternatively include a situation that the coded enhanced quantization parameter is the preset minimum value discontinuously for the preset number of times, for example, the coded enhanced quantization parameter has been the preset minimum value for the preset number of times. The updated enhanced quantization parameter refers to a quantization parameter on the enhancement layer that is obtained by adjusting the quantization parameter through the preset target bit rate. The updated enhanced quantization information refers to information obtained by using the updated enhanced quantization parameter to quantify the loss information.

In some embodiments, the terminal determines whether the coded enhanced quantization parameter satisfies the preset enhanced quantization parameter adjustment condition, updates the initial enhanced quantization parameter to obtain the updated enhanced quantization parameter when the coded enhanced quantization parameter satisfies the preset enhanced quantization parameter adjustment condition, and quantifies the loss information by using the updated enhanced quantization parameter to obtain the updated enhanced quantization information.

In the foregoing embodiment, a coded enhanced quantization parameter corresponding to the coded images in the video is obtained when the coded target bit rate is not the same as a preset total bit rate, the initial enhanced quantization parameter is updated to obtain an updated enhanced quantization parameter when the coded enhanced quantization parameter satisfies a preset enhanced quantization parameter adjustment condition, and the loss information is quantified by using the updated enhanced quantization parameter to obtain updated enhanced quantization information. That is, the initial enhanced quantization parameter is updated according to a magnitude relationship between the coded target bit rate and the preset total bit rate, the updated enhanced quantization information is obtained, and then the updated enhanced quantization information may be used to compute the enhanced bit rate, whereby the accuracy of the obtained initial enhanced bit rate can be improved, that is, the bit rate on the enhancement layer can be accurately controlled; and then video coding is performed, thereby improving the video coding quality.

Figure 4:
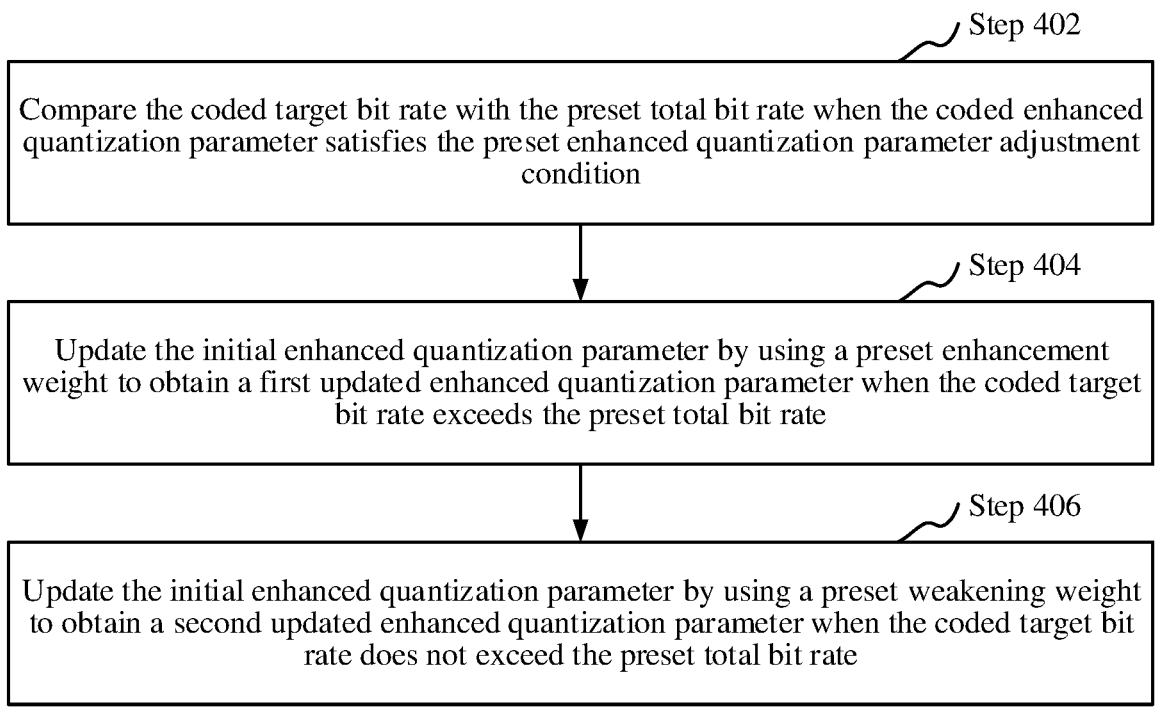
FIG. 4 is a schematic flowchart of obtaining an updated enhanced quantization parameter in an embodiment.

In an embodiment, as shown in FIG. 4, step 306, namely, updating the initial enhanced quantization parameter to obtain an updated enhanced quantization parameter when the coded enhanced quantization parameter satisfies a preset enhanced quantization parameter adjustment condition, includes:

Step 402: Compare the coded target bit rate with the preset total bit rate when the coded enhanced quantization parameter satisfies the preset enhanced quantization parameter adjustment condition.

The preset enhanced quantization parameter adjustment condition refers to a preset condition that may adjust the enhanced quantization parameter. The condition is set for the enhanced quantization parameter, and may be whether the coded enhanced quantization parameter is a preset minimum value continuously for a preset number of times. When the coded enhanced quantization parameter is not the preset minimum value continuously for the preset number of times, the coded enhanced quantization parameter satisfies the preset enhanced quantization parameter adjustment condition. When the coded enhanced quantization parameter has been the preset minimum value continuously for the preset number of times, the coded enhanced quantization parameter does not satisfy the preset enhanced quantization parameter adjustment condition.

In some embodiments, the terminal determines that the coded enhanced quantization parameter is not the preset minimum value continuously for the preset number of times, indicating that there is still room for adjustment of the enhanced quantization parameter, that is, the enhanced quantization parameter may be further adjusted to improve the accuracy of the coding result output by the enhancement layer. At this point, the terminal further compares magnitudes of the coded target bit rate and the preset total bit rate.

Step 404: Update the initial enhanced quantization parameter by using a preset enhancement weight to obtain a first updated enhanced quantization parameter when the coded target bit rate exceeds the preset total bit rate.

In some embodiments, the terminal determines that the coded target bit rate exceeds the preset total bit rate, indicating that the quantization parameter of the enhancement layer is too small and needs to be increased, that is, the terminal performs a weighted computation on the initial enhanced quantization parameter by using the preset weight used for increasing the quantization parameter, to obtain a weighted quantization parameter, namely, the first updated enhanced quantization parameter. At this point, the terminal performs enhancement layer coding by using the first updated enhanced quantization parameter, to obtain an output bitstream.

Step 406: Update the initial enhanced quantization parameter by using a preset weakening weight to obtain a second updated enhanced quantization parameter when the coded target bit rate does not exceed the preset total bit rate.

In some embodiments, the terminal determines that the coded target bit rate does not exceed the preset total bit rate, indicating that the quantization parameter of the enhancement layer is too high. In this case, the quantization parameter needs to be decreased. The terminal performs a weighted computation on the initial enhanced quantization parameter by using the preset weight used for decreasing the quantization parameter, to obtain a weighted quantization parameter, namely, the second updated enhanced quantization parameter. At this point, the terminal performs enhancement layer coding by using the second updated enhanced quantization parameter, to obtain an output bitstream. The initial enhanced quantization parameter is adjusted according to the magnitude relationship between the coded target bit rate and the preset total bit rate, whereby the magnitude of the finally obtained bitstream conforms to an expected target value, the bit rate of the enhancement layer may be accurately controlled, and the video coding quality may be improved.

In an embodiment, the method further includes the following steps:

updating the basic quantization parameter to obtain an updated basic quantization parameter when the coded enhanced quantization parameter does not satisfy the preset enhanced quantization parameter adjustment condition; and using the updated basic quantization parameter as a basic quantization parameter for an adjacent to-be-coded image corresponding to the current to-be-coded image.

The updated basic quantization parameter refers to an updated quantization parameter used in the base layer. The adjacent to-be-coded image refers to a to-be-coded image in a next frame corresponding to the current to-be-coded image in the video.

In some embodiments, the terminal determines that the coded enhanced quantization parameter does not satisfy the preset enhanced quantization parameter adjustment condition, indicating that the bit rate actually used by the enhancement layer has reached a maximum value. In this case, the excess bit rate may be allocated to the base layer for basic coding, that is, the terminal updates the basic quantization parameter to obtain the updated basic quantization parameter, and uses the updated basic quantization parameter to perform base layer coding on the next frame of image. The terminal may alternatively directly obtain a base layer bit rate, perform a weighted computation on the base layer bit rate according to a preset enhancing weight to obtain an increased base layer bit rate, and then use the increased base layer bit rate as a bit rate for base layer coding on the next frame of image, thereby improving base layer coding accuracy and further improving the video coding quality.

Figure 5:
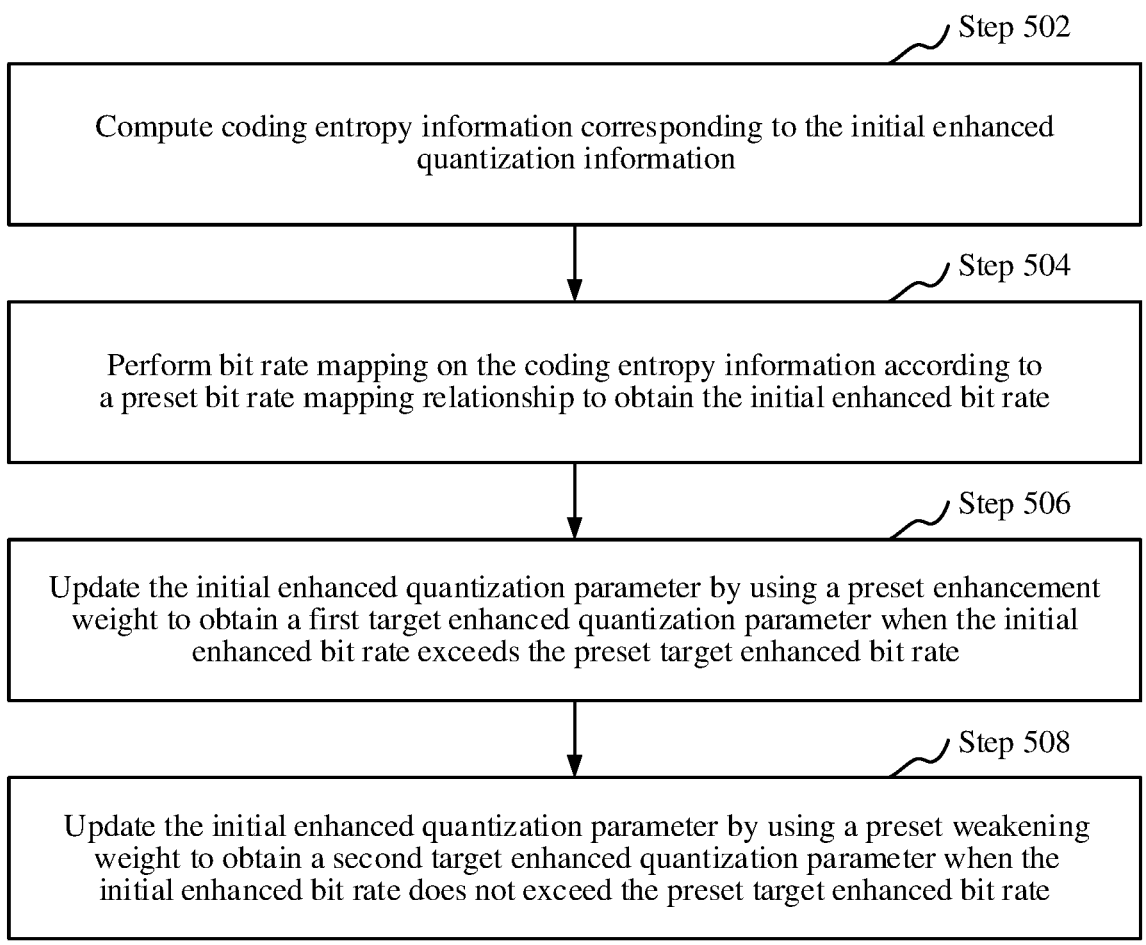
FIG. 5 is a schematic flowchart of obtaining a target enhanced quantization parameter in an embodiment.

In an embodiment, as shown in FIG. 5, step 206, computing a bit rate based on the initial enhanced quantization information to obtain an initial enhanced bit rate corresponding to the current to-be-coded image, and adjusting the initial enhanced quantization parameter when there is a difference between the initial enhanced bit rate and a preset target enhanced bit rate, to obtain a target enhanced quantization parameter, includes:

Step 502: Compute coding entropy information corresponding to the initial enhanced quantization information.

Step 504: Perform bit rate mapping on the coding entropy information according to a preset bit rate mapping relationship to obtain the initial enhanced bit rate.

The coding entropy information refers to information used for measuring the magnitude of an enhancement layer coding bitstream, and the coding entropy information is linearly related to the magnitude of the enhancement layer bitstream. The coding entropy information and the magnitude of the enhancement layer bitstream may be controlled by adjusting the quantization parameter of the enhancement layer. That is, the magnitude of the coding bitstream may be controlled by adjusting the quantization parameter. The initial enhanced bit rate refers to the enhancement layer coding bitstream actually used at the initial stage. The preset bit rate mapping relationship refers to a linear relationship between preset coding entropy information and a bit rate.

In some embodiments, the terminal computes the corresponding coding entropy information according to the magnitude of a quantization value in the initial enhanced quantization information, and then performs the bit rate mapping on the coding entropy information according to the preset bit rate mapping relationship to obtain the initial enhanced bit rate.

Step 506: Update the initial enhanced quantization parameter by using a preset enhancement weight to obtain a first target enhanced quantization parameter when the initial enhanced bit rate exceeds the preset target enhanced bit rate.

The preset target enhanced bit rate refers to a preset bit rate used during enhanced coding. The preset target enhanced bit rate may be allocated according to the preset target bit rate.

In some embodiments, when the initial enhanced bit rate exceeds the preset target enhanced bit rate, it indicates that the quantization parameter actually used during the enhanced coding is small. In this case, the initial enhanced quantization parameter needs to be increased. Therefore, weighted computation may be performed on the initial enhanced quantization parameter by using the preset enhancement weight used for increasing the quantization parameter, to obtain a weighted enhanced quantization parameter, namely, the first target enhanced quantization parameter.

Step 508: Update the initial enhanced quantization parameter by using a preset weakening weight to obtain a second target enhanced quantization parameter when the initial enhanced bit rate does not exceed the preset target enhanced bit rate.

In some embodiments, when the initial enhanced bit rate does not exceed the preset target enhanced bit rate, it indicates that the quantization parameter actually used during the enhanced coding is large. In this case, the initial enhanced quantization parameter needs to be decreased. Therefore, weighted computation may be performed on the initial enhanced quantization parameter by using the preset weakening weight used for decreasing the quantization parameter, to obtain a weighted enhanced quantization parameter, namely, the second target enhanced quantization parameter.

In the foregoing embodiment, the initial enhanced bit rate is compared with the preset target enhanced bit rate, and the initial enhanced quantization parameter is updated with different weights according to different comparison results, to obtain a weighted enhanced quantization parameter, whereby the accuracy of the obtained target enhanced quantization parameter is improved. Then, the target enhanced quantization parameter is used for subsequent coding, thereby controlling the bit rate and further improving the video coding quality.

Figure 6:
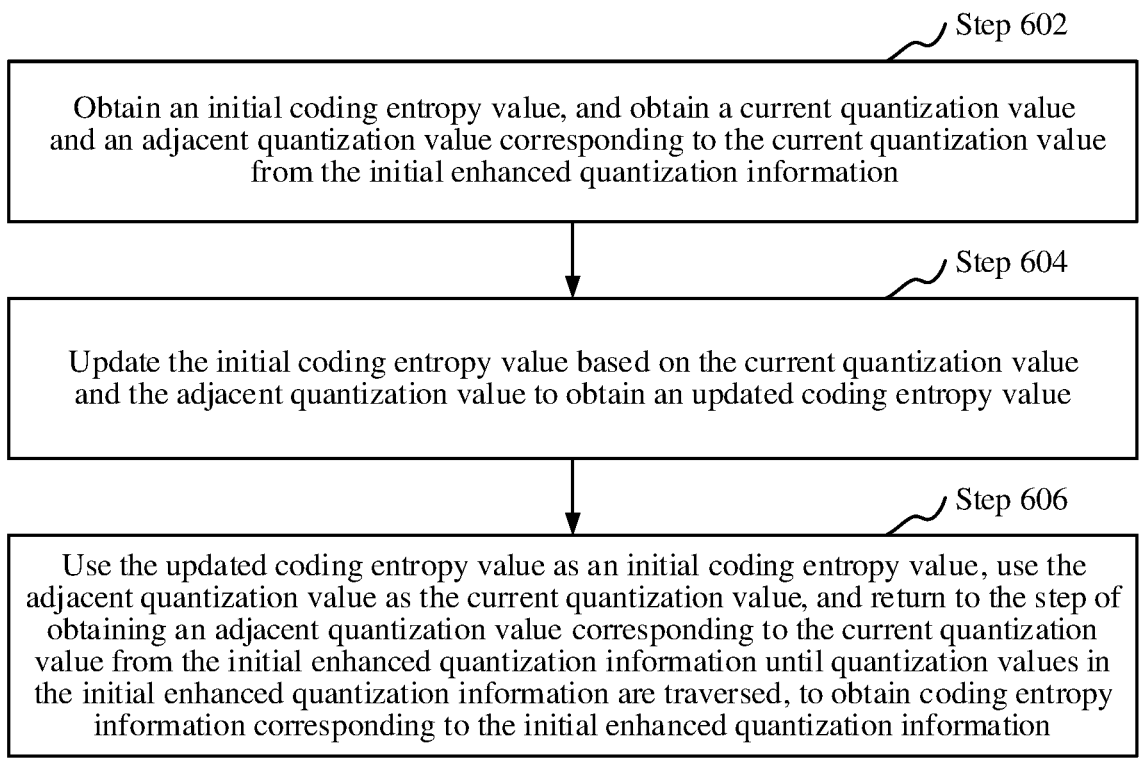
FIG. 6 is a schematic flowchart of obtaining coding entropy information in an embodiment.

In an embodiment, as shown in FIG. 6, step 502, namely, computing coding entropy information corresponding to the initial enhanced quantization information, includes:

Step 602: Obtain an initial coding entropy value, and obtain a current quantization value and an adjacent quantization value corresponding to the current quantization value from the initial enhanced quantization information.

The initial coding entropy value refers to a preset initial value of a coding entropy, and may be set according to a requirement. For example, the initial value of the coding entropy may be defined as zero. The current quantization value refers to a current to-be-computed quantization value in the initial enhanced quantization information. The adjacent quantization value refers to a quantization value adjacent to the current quantization value in the initial enhanced quantization information. For example, the initial enhanced quantization information is a quantization matrix, each matrix element value is used as the current quantization value, and the next element value is used as the adjacent quantization value.

In some embodiments, the terminal obtains the initial coding entropy value, and then sequentially obtains the current quantization value and the adjacent quantization value corresponding to the current quantization value from the initial enhanced quantization information.

Step 604: Update the initial coding entropy value based on the current quantization value and the adjacent quantization value to obtain an updated coding entropy value.

The updated coding entropy value refers to a coding entropy value obtained after updating an initial coding entropy. The updated coding entropy value may be the same as the initial coding entropy value or different from the initial coding entropy value.

In some embodiments, the terminal compares the current quantization value with the adjacent quantization value, and updates the initial coding entropy value according to the comparison result to obtain the updated coding entropy value.

Step 606: Use the updated coding entropy value as an initial coding entropy value, use the adjacent quantization value as the current quantization value, and return to the step of obtaining an adjacent quantization value corresponding to the current quantization value from the initial enhanced quantization information until quantization values in the initial enhanced quantization information are traversed, to obtain the coding entropy information corresponding to the initial enhanced quantization information.

In some embodiments, the terminal uses the updated coding entropy value as the initial coding entropy, use the adjacent quantization value as the current quantization value, and returns to the step of obtaining the adjacent quantization value corresponding to the current quantization value from the initial enhanced quantization information until the quantization values in the initial enhanced quantization information are traversed, to obtain the coding entropy information corresponding to the initial enhanced quantization information.

In an embodiment, step 604, namely, updating the initial coding entropy value based on the current quantization value and the adjacent quantization value to obtain an updated coding entropy value includes:

auto-increasing the initial coding entropy value to obtain the updated coding entropy value when the current quantization value and the adjacent quantization value are different; or using the initial coding entropy value as the updated coding entropy value when the current quantization value and the adjacent quantization value are the same.

In some embodiments, when the current quantization value and the adjacent quantization value are different, the coding entropy value changes, and the initial coding entropy value may be auto-increased, for example, a preset value is added to the initial coding entropy value, to obtain the updated coding entropy value. Alternatively, when the current quantization value and the adjacent quantization value are the same, the coding entropy value remains unchanged, that is, the initial coding entropy value is directly used as the updated coding entropy value.

Figure 7:
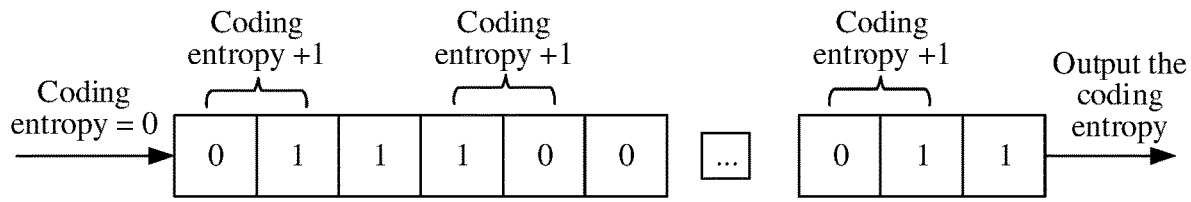
FIG. 7 is a schematic diagram of computing coding entropy information in an embodiment.

In one example embodiment, FIG. 7 shows a schematic diagram of a computing method for an enhancement layer coding entropy, where an initial value of the coding entropy is set to zero, and a current value of each element and a value of a next element in a quantization matrix are read. If the next value changes from the current value, the coding entropy value is increased by 1, and if the next value does not change, the coding entropy value remains unchanged. The entire quantization matrix is circularly read to obtain a final coding entropy and output a final coding entropy value. For example, a coding entropy value is 0, and a coding entropy value of a quantization value 0111100 is to be computed, where the current quantization value is 0, the adjacent quantization value is 1, the current quantization value and the adjacent quantization value are different, and the coding entropy value is auto-increased by 1 to obtain a coding entropy value 1. The current quantization value is 1, the adjacent quantization value is 1, the current quantization value and the adjacent quantization value are the same, and the coding entropy value remains unchanged and is still 1. Until the current quantization value is 1 and the adjacent quantization value is 0, the current quantization value and the adjacent quantization value are different, and the coding entropy value is auto-increased by 1 to obtain a coding entropy value 2. Then the current quantization value is 0, the adjacent quantization value is 0, and the coding entropy remains unchanged and is still 2. That is, the coding entropy value of the quantization value 0111100 is 2.

In the foregoing embodiment, the initial coding entropy value is auto-increased to obtain the updated coding entropy value when the current quantization value and the adjacent quantization value are different; and when the current quantization value and the adjacent quantization value are the same, the initial coding entropy value is used as an initial coding entropy, the adjacent quantization value is used as a current quantization value, and the step of obtaining an adjacent quantization value corresponding to the current quantization value from the initial enhanced quantization information is performed again until quantization values in the initial enhanced quantization information are traversed, to obtain the coding entropy information corresponding to the initial enhanced quantization information. Through simple comparison of quantization values and update of the coding entropy value according to the comparison result, complexity of computing a coding entropy may be reduced without affecting the coding quality, and coding efficiency may be improved.

In an embodiment, the video coding method further includes the following the step:

performing entropy coding based on the initial enhanced quantization information to obtain current enhanced coding information when there is no difference between the initial enhanced bit rate and the preset target enhanced bit rate.

In some embodiments, the terminal determines that there is no difference between the initial enhanced bit rate and the preset target enhanced bit rate, that is, the initial enhanced bit rate is the same as the preset target enhanced bit rate. In this case, the bit rate does not need to be adjusted, entropy coding may be directly performed by using the initial enhanced quantization information to obtain the current enhanced coding information, that is, enhancement layer coding is directly performed by using the initial enhanced bit rate to obtain an output bitstream, namely, the current enhanced coding information.

Step 208, namely, obtaining target coding information corresponding to the current to-be-coded image based on the basic coding information and the target enhanced coding information, includes the following step:

obtaining current coding information corresponding to the current to-be-coded image based on the basic coding information and the current enhanced coding information.

In some embodiments, when the terminal determines that the initial enhanced bit rate is the same as the preset target enhanced bit rate, the terminal does not need to adjust the bit rate, but directly performs entropy coding by using the initial enhanced bit rate to obtain the current enhanced coding information, and then obtains the current coding information corresponding to the current to-be-coded image based on the basic coding information and the current enhanced coding information. When there is no difference between the bit rate used in the enhancement layer during coding and the preset bit rate, the terminal directly uses the bit rate for coding, thereby ensuring the video coding quality.

Figure 8:
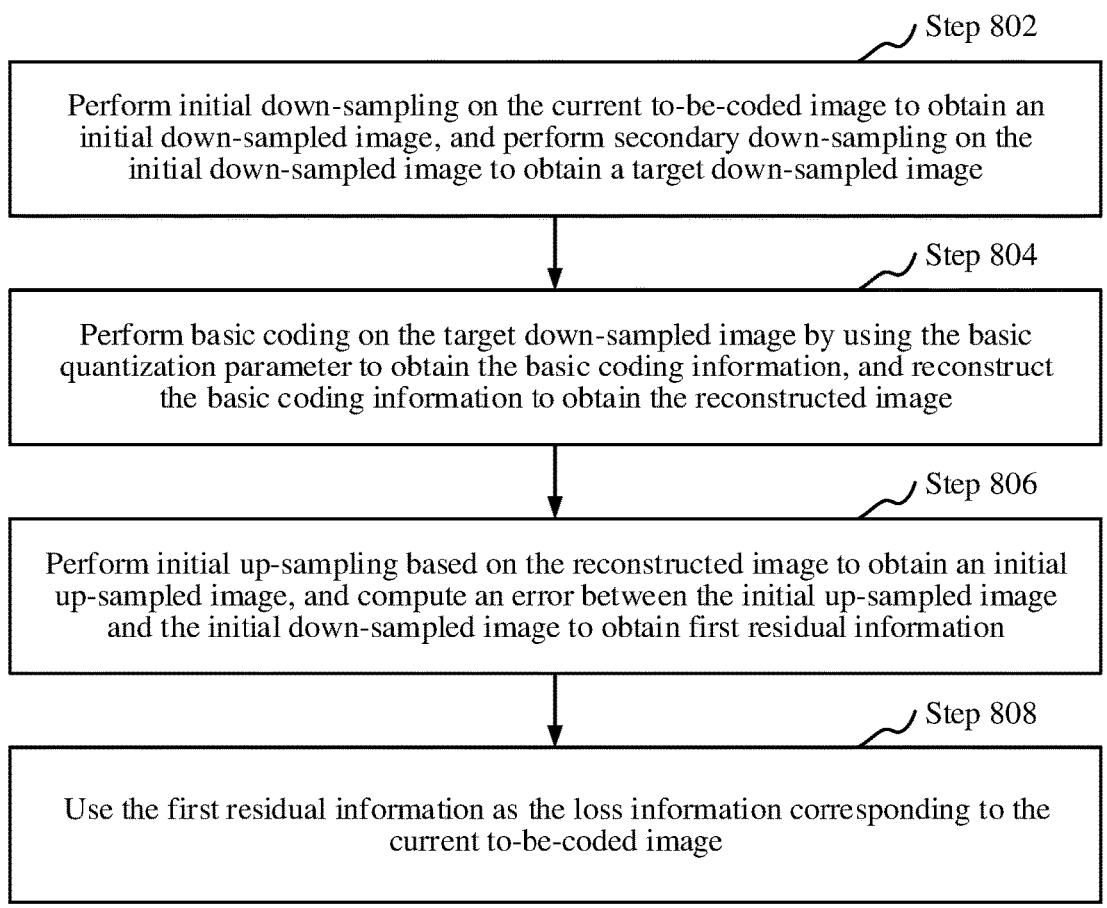
FIG. 8 is a schematic flowchart of obtaining loss information in an embodiment.

In an embodiment, as shown in FIG. 8, step 202, namely, obtaining basic coding information and a basic quantization parameter corresponding to a current to-be-coded image in a video, reconstructing the basic coding information to obtain a reconstructed image, and computing a loss between the reconstructed image and the current to-be-coded image to obtain loss information, includes:

Step 802: Perform initial down-sampling on the current to-be-coded image to obtain an initial down-sampled image, and perform secondary down-sampling on the initial down-sampled image to obtain a target down-sampled image.

In some embodiments, before performing basic coding on the current to-be-coded image, the terminal may perform two down-sampling processes on the current to-be-coded image to obtain a reduced image, that is, first perform initial down-sampling on the current to-be-coded image to obtain the initial down-sampled image, and then perform further down-sampling on the initial down-sampled image to obtain the target down-sampled image.

Step 804: Perform basic coding on the target down-sampled image by using the basic quantization parameter to obtain the basic coding information, and reconstruct the basic coding information to obtain the reconstructed image.

In some embodiments, the terminal may perform base layer coding, that is, code the target down-sampled image by using an existing video encoder, for example, perform coding of the base layer by using AVC (Advanced Video Coding), HEVC (High Efficiency Video Coding) VVC (Versatile Video Coding), AV1 (AOMedia Video Codec 1.0), or the like, to obtain a bitstream output by the base layer, namely, obtain the basic coding information. Then, the terminal reconstructs the basic coding information output by the base layer, that is, decodes the bitstream output by the base layer, to obtain the reconstructed image.

Step 806: Perform initial up-sampling based on the reconstructed image to obtain an initial up-sampled image, and compute an error between the initial up-sampled image and the initial down-sampled image to obtain first residual information.

In some embodiments, the terminal performs first up-sampling by using the reconstructed image to obtain a result of the first up-sampling, namely, the initial up-sampled image. At this point, the terminal computes a residual between the initial up-sampled image and the initial down-sampled image to obtain the first residual information, the first residual information being used for representing the error between the initial up-sampled image and the initial down-sampled image, namely, representing the error of the basic coding.

Step 808: Use the first residual information as the loss information corresponding to the current to-be-coded image.

In some embodiments, the terminal uses the first residual information as the loss information corresponding to the current to-be-coded image. The LCEVC encoder includes a first enhancement layer and a second enhancement layer, and a data volume of enhanced coding on the second enhancement layer is much higher than that of enhanced coding on the first enhancement layer. Then, when the server performs enhanced coding on the first enhancement layer, the server may control the bit rate of the first enhancement layer, that is, use the first residual information as the loss information corresponding to the current to-be-coded image. Next, the loss information which is the first residual information is quantified by using the initial enhanced quantization parameter to obtain the initial enhanced quantization information, and the bit rate is computed based on the initial enhanced quantization information to obtain the initial enhanced bit rate corresponding to the current to-be-coded image. When there is a difference between the initial enhanced bit rate and the preset target enhanced bit rate, the initial enhanced quantization parameter is adjusted to obtain the target enhanced quantization parameter, and the loss information is coded based on the target enhanced quantization parameter to obtain the target enhanced coding information. The obtained target enhanced coding information is a video enhanced coding bitstream output by the first enhancement layer. That is, by controlling the bit rate of the first enhancement layer, the accuracy of the video enhanced coding bitstream output by the first enhancement layer may be improved, thereby improving the video coding quality.

In an embodiment, step 808, namely, using the first residual information as the loss information corresponding to the current to-be-coded image, includes:

up-sampling based on the initial up-sampled image to obtain a target up-sampled image, and computing an error between the target up-sampled image and the current to-be-coded image to obtain second residual information; and using the second residual information as the loss information corresponding to the current to-be-coded image.

The target up-sampled image refers to an image obtained after two times of up-sampling of the reconstructed image.

In some embodiments, the terminal performs up-sampling on the initial up-sampled image again to obtain a final sampling result, namely, the target up-sampled image, and then, computes a direct residual between the target up-sampled image and the original image, namely, the current to-be-coded image, to obtain the second residual information. In this case, the terminal may use the second residual information as the loss information corresponding to the current to-be-coded image, and perform enhanced coding on the second enhancement layer. At this time, the bit rate of the second enhancement layer may be controlled by using the second residual information as the loss information corresponding to the current to-be-coded image. Next, the loss information which is the second residual information is quantified by using the initial enhanced quantization parameter to obtain the initial enhanced quantization information, and the bit rate is computed based on the initial enhanced quantization information to obtain the initial enhanced bit rate corresponding to the current to-be-coded image. When there is a difference between the initial enhanced bit rate and the preset target enhanced bit rate, the initial enhanced quantization parameter is adjusted to obtain the target enhanced quantization parameter, and the loss information is coded based on the target enhanced quantization parameter to obtain the target enhanced coding information. The obtained target enhanced coding information is a video enhanced coding bitstream output by the second enhancement layer. That is, by controlling the bit rate of the second enhancement layer, the accuracy of the video enhanced coding bitstream output by the second enhancement layer may be improved, thereby improving the video coding quality. Because the data volume of enhanced coding on the second enhancement layer is much higher than that of enhanced coding on the first enhancement layer, controlling the bit rate of enhanced coding on the second enhancement layer may ensure that the enhanced coding bitstream output by the second enhancement layer is more accurate, thereby improving the video coding quality.

In the foregoing embodiment, the enhanced bit rate used during enhanced coding on the video is controlled, so that the obtained video coding result has higher quality under the same bit rate setting.

Figure 9:
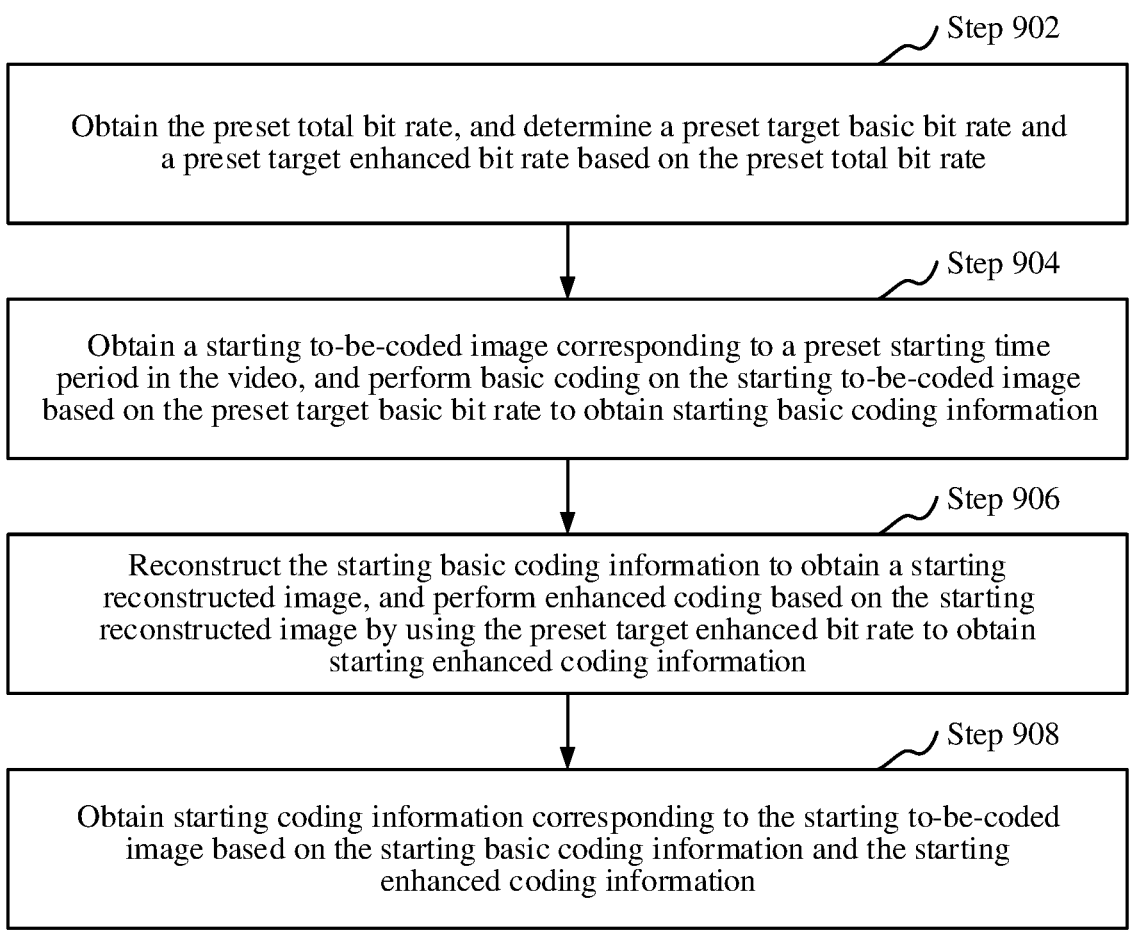
FIG. 9 is a schematic flowchart of obtaining loss information in another embodiment.

In an embodiment, as shown in FIG. 9, before step 202, namely, before obtaining basic coding information and a basic quantization parameter corresponding to a current to-be-coded image in a video, the method further includes:

Step 902: Obtain the preset total bit rate, and determine a preset target basic bit rate and a preset target enhanced bit rate based on the preset total bit rate.

The preset total bit rate refers to a preset total bit rate during video coding. The preset target basic bit rate refers to a bit rate allocated according to the preset total bit rate and used during basic coding. The preset target enhanced bit rate refers to a bit rate allocated according to the preset total bit rate and used during enhanced coding.

In some embodiments, the terminal obtains the preset total bit rate, and then allocates the preset total bit rate according to a preset ratio to obtain the preset target basic bit rate and the preset target enhanced bit rate.

Step 904: Obtain a starting to-be-coded image corresponding to a preset starting time period in the video, and perform basic coding on the starting to-be-coded image based on the preset target basic bit rate to obtain starting basic coding information.

The preset starting time period refers to a preset time period for video coding using the preset target basic bit rate and the preset target enhanced bit rate, and the video starts at the time period. The starting to-be-coded image refers to an image within the preset starting time period in the starting video. The starting basic coding information refers to a bitstream obtained after basic coding on the starting to-be-coded image.

In some embodiments, the terminal obtains the starting to-be-coded image corresponding to the preset starting time period, and then uses the preset target basic bit rate to perform basic coding on the starting to-be-coded image, that is, uses the existing encoder to code the starting to-be-coded image, to obtain the starting basic coding information.

Step 906: Reconstruct the starting basic coding information to obtain a starting reconstructed image, and perform enhanced coding based on the starting reconstructed image by using the preset target enhanced bit rate to obtain starting enhanced coding information.

The starting enhanced coding information refers to a bitstream obtained after enhanced coding.

In some embodiments, the server performs enhanced coding, namely, reconstructs the starting basic coding information to obtain the starting reconstructed image, and then performs enhanced coding on the starting reconstructed image according to the preset target enhanced bit rate, namely, computes a residual through the reconstructed image, and performs compressive coding on the residual to obtain the starting enhanced coding information.

Step 908: Obtain starting coding information corresponding to the starting to-be-coded image based on the starting basic coding information and the starting enhanced coding information.

In some embodiments, the terminal obtains the starting coding information corresponding to the starting to-be-coded image based on the starting basic coding information and the starting enhanced coding information.

In an example embodiment, the video may be coded by using an LCEVC encoder, namely, the starting to-be-coded image in the video is subjected to down-sampling twice to obtain a small-sized video image, then the small-sized video image is coded by using the existing video encoder according to the preset target basic bit rate to obtain a base layer bitstream, the bit rate of the base layer is reconstructed to obtain a reconstructed image, first up-sampling is performed on the reconstructed image, a residual between the up-sampled image and the down-sampled image obtained at the same level is computed, and compressive coding, namely, transformation, quantization, and entropy coding, is performed on the residual to obtain a first enhancement layer bitstream output by the first enhancement layer. Then, second up-sampling is performed on the first up-sampled image, a residual between the second up-sampled image and the original image is computed, and compressive coding, namely, transformation, quantization, and entropy coding, is performed on the residual to obtain a second enhancement layer bitstream output by the second enhancement layer. Finally, a bitstream of the starting to-be-coded image coded by the LCEVC encoder is obtained according to the base layer bitstream, the first enhancement layer bitstream, and the second enhancement layer bitstream. Using the preset target basic bit rate and the preset target enhanced bit rate for basic coding and enhanced coding at the starting time period may ensure the video coding quality.

Figure 10:
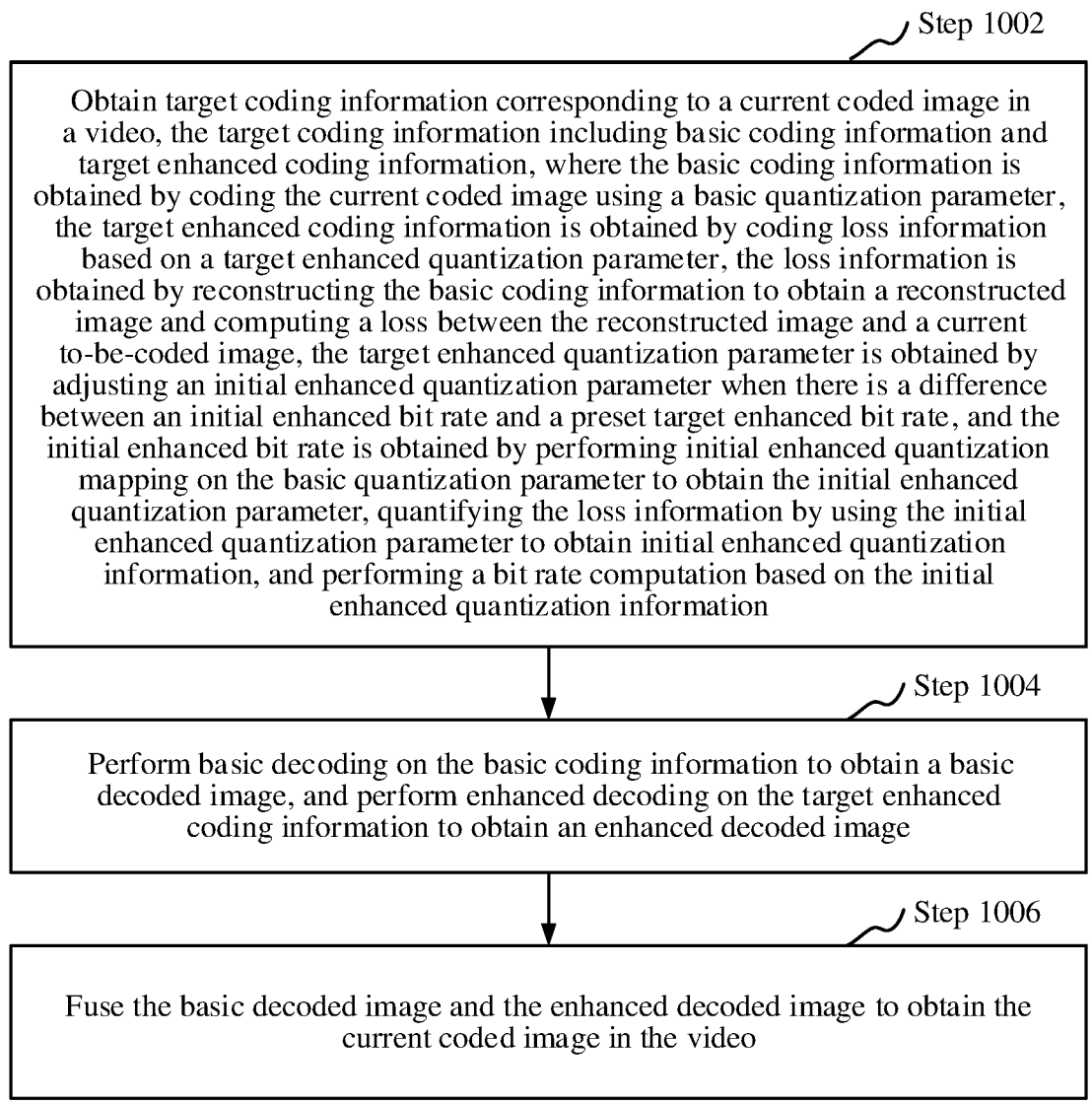
FIG. 10 is a schematic flowchart of a video decoding method in an embodiment.

In an embodiment, as shown in FIG. 10, a video decoding method is provided. The method is applied to the terminal in FIG. 1 as an example for description. It may be understood that the method may alternatively be applied to a server, or applied to a system including a terminal and a server and implemented through interaction between the terminal and the server. In this embodiment, the following steps are included:

Step 1002: Obtain target coding information corresponding to a current coded image in a video, the target coding information including basic coding information and target enhanced coding information, where the basic coding information is obtained by coding the current coded image using a basic quantization parameter, the target enhanced coding information is obtained by coding loss information based on a target enhanced quantization parameter, the loss information is obtained by reconstructing the basic coding information to obtain a reconstructed image and computing a loss between the reconstructed image and a current to-be-coded image, the target enhanced quantization parameter is obtained by adjusting an initial enhanced quantization parameter when there is a difference between an initial enhanced bit rate and a preset target enhanced bit rate, and the initial enhanced bit rate is obtained by performing initial enhanced quantization mapping on the basic quantization parameter to obtain the initial enhanced quantization parameter, quantifying the loss information by using the initial enhanced quantization parameter to obtain initial enhanced quantization information, and performing a bit rate computation based on the initial enhanced quantization information.

In some embodiments, a decoding terminal may obtain, from a coding terminal, the target coding information corresponding to the current coded image in the video, the target coding information including basic coding information and target enhanced coding information. The decoding terminal may alternatively obtain, from a server, the target coding information corresponding to the current coded image in the transmitted video. The decoding terminal may alternatively obtain, from a service provider providing video services, the target coding information corresponding to the current coded image in the video. The decoding terminal may alternatively obtain, from a cloud server, the target coding information corresponding to the current coded image in the video.

Step 1004: Perform basic decoding on the basic coding information to obtain a basic decoded image, and perform enhanced decoding on the target enhanced coding information to obtain an enhanced decoded image.

The basic decoded image refers to an image obtained after basic decoding on a bitstream obtained by coding with an existing encoder. The enhanced decoded image refers to an image obtained after enhanced decoding on an enhanced coding bitstream.

In some embodiments, the terminal performs basic decoding on the basic coding information to obtain the basic decoded image, and performs enhanced decoding on the target enhanced coding information to obtain the enhanced decoded image.

Step 1006: Fuse the basic decoded image and the enhanced decoded image to obtain the current coded image in the video.

In some embodiments, the terminal adds the basic decoded image and the enhanced decoded image to obtain the current coded image in the video. In an embodiment, when the target enhanced coding information includes first layer enhanced coding information and second layer enhanced coding information, the basic decoded image is up-sampled, the obtained up-sampled result is added to a result obtained by decoding the first layer enhanced coding information to obtain a combined intermediate image, then the combined intermediate image is up-sampled, and the obtained up-sampled result is added to a result obtained by decoding the second layer enhanced coding information to obtain a final output image. In one example embodiment, the server uses an LCEVC decoder to decode the obtained target coding information corresponding to the current coded image in the video, to obtain an output decoding result, namely, to obtain the current coded image in the video, and then displays the current coded image in the video.

In the foregoing video decoding method, the adjusted target enhanced quantization parameter is coded to obtain target enhanced coding information, which improves accuracy of the obtained target enhanced coding information, thereby improving accuracy of the obtained target coding information. Then, the basic coding information and the target enhanced coding information are decoded and fused to obtain the current coded image in the video, thereby improving accuracy of the obtained current coded image, namely, ensuring video decoding quality.

Figure 11:
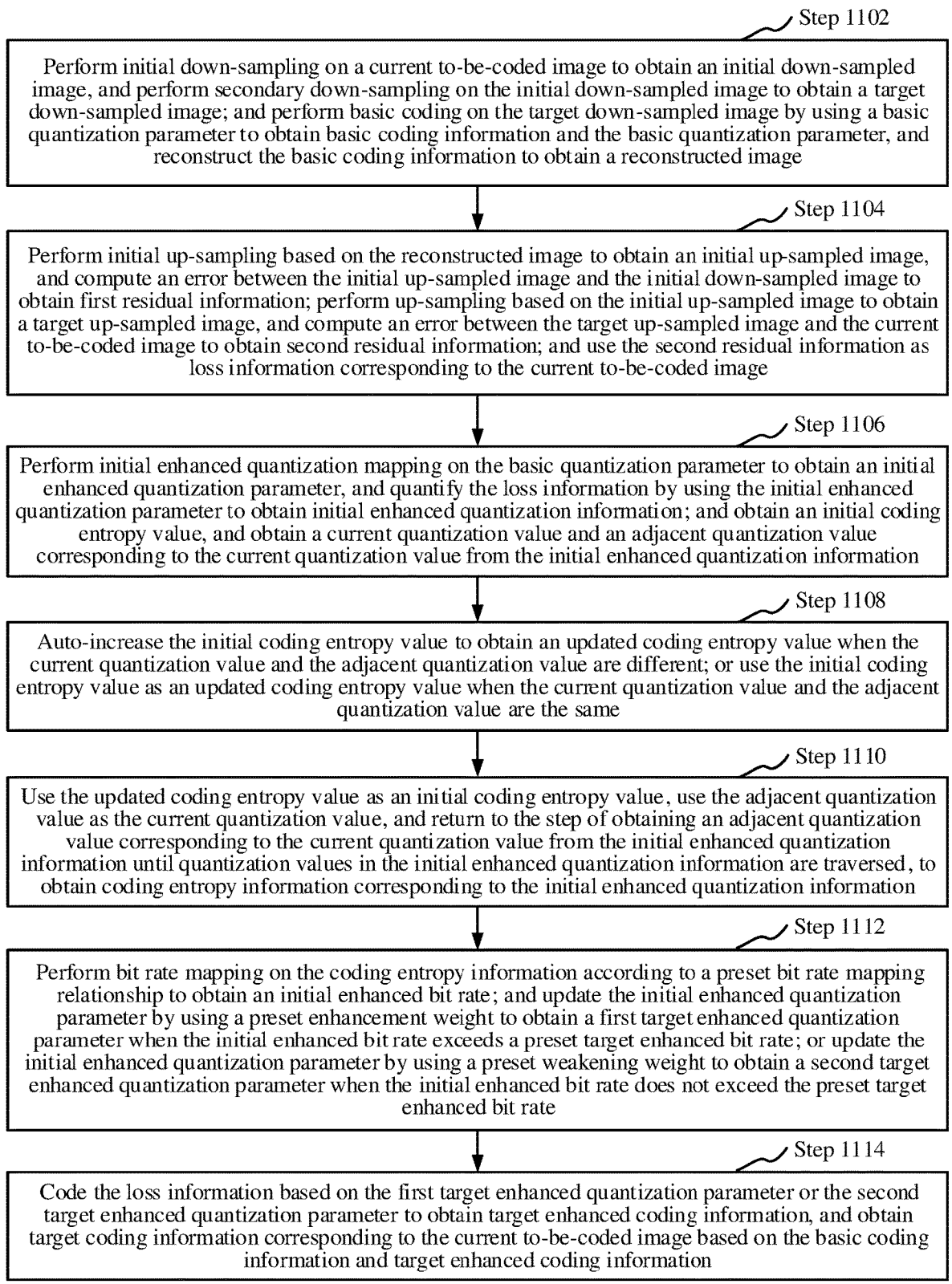
FIG. 11 is a schematic flowchart of a video coding method in an example embodiment.

In an embodiment, as shown in FIG. 11, a video coding method is provided, specifically including the following steps:

Step 1102: Perform initial down-sampling on a current to-be-coded image to obtain an initial down-sampled image, and perform secondary down-sampling on the initial down-sampled image to obtain a target down-sampled image; and perform basic coding on the target down-sampled image by using a basic quantization parameter to obtain basic coding information and the basic quantization parameter, and reconstruct the basic coding information to obtain a reconstructed image.

Step 1104: Perform initial up-sampling based on the reconstructed image to obtain an initial up-sampled image, and compute an error between the initial up-sampled image and the initial down-sampled image to obtain first residual information; up-sample based on the initial up-sampled image to obtain a target up-sampled image, and compute an error between the target up-sampled image and the current to-be-coded image to obtain second residual information; and use the second residual information as loss information corresponding to the current to-be-coded image.

Step 1106: Perform initial enhanced quantization mapping on the basic quantization parameter to obtain an initial enhanced quantization parameter, and quantify the loss information by using the initial enhanced quantization parameter to obtain initial enhanced quantization information; and obtain an initial coding entropy value, and obtain a current quantization value and an adjacent quantization value corresponding to the current quantization value from the initial enhanced quantization information.

Step 1108: Auto-increase the initial coding entropy value to obtain an updated coding entropy value when the current quantization value and the adjacent quantization value are different; or use the initial coding entropy value as an updated coding entropy value when the current quantization value and the adjacent quantization value are the same.

Step 1110: Use the updated coding entropy value as an initial coding entropy value, use the adjacent quantization value as the current quantization value, and return to the step of obtaining an adjacent quantization value corresponding to the current quantization value from the initial enhanced quantization information until quantization values in the initial enhanced quantization information are traversed, to obtain coding entropy information corresponding to the initial enhanced quantization information.

Step 1112: Perform bit rate mapping on the coding entropy information according to a preset bit rate mapping relationship to obtain an initial enhanced bit rate; and update the initial enhanced quantization parameter by using a preset enhancement weight to obtain a first target enhanced quantization parameter when the initial enhanced bit rate exceeds a preset target enhanced bit rate; or update the initial enhanced quantization parameter by using a preset weakening weight to obtain a second target enhanced quantization parameter when the initial enhanced bit rate does not exceed the preset target enhanced bit rate.

Step 1114: Code the loss information based on the first target enhanced quantization parameter or the second target enhanced quantization parameter to obtain target enhanced coding information, and obtain target coding information corresponding to the current to-be-coded image based on the basic coding information and target enhanced coding information.

Figure 12:
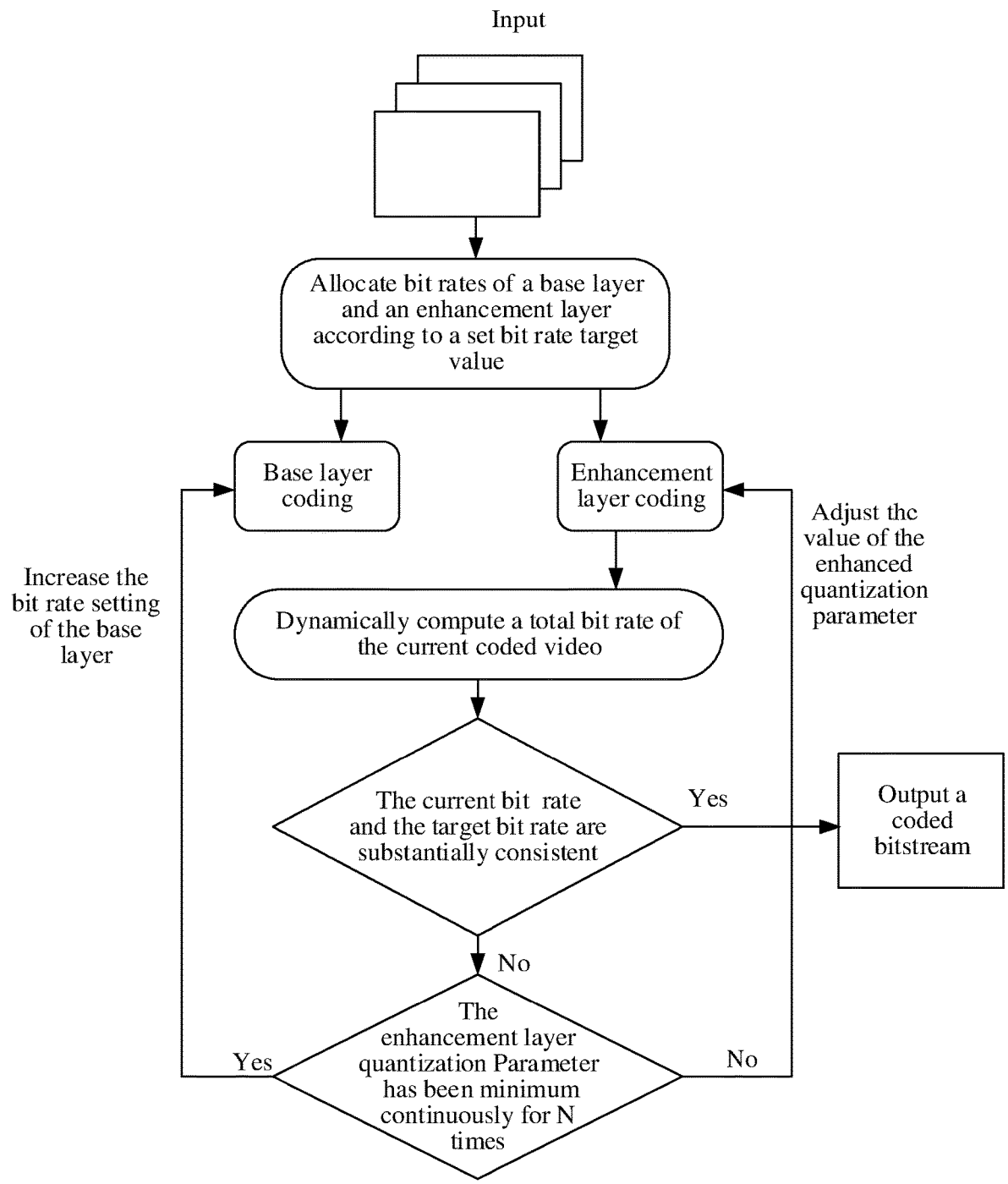
FIG. 12 is a schematic diagram of a framework of a video coding system in an embodiment.

In one example embodiment, as shown in FIG. 12, a schematic diagram of a framework of a video coding system is provided, specifically: Input video images are obtained, and then bit rate proportions of a base layer and an enhancement layer are allocated according to a set bit rate target value to obtain a base layer preset bit rate and an enhancement layer preset bit rate. Base layer coding and enhancement layer coding are performed on the video images, basic coding is performed on a current to-be-coded image after coding for a period of time to obtain basic coding information and a basic quantization parameter, and then a current coded bit rate corresponding to current coded video images is computed. Whether the current coded bit rate is the same as the set bit rate target value is determined, and enhanced coding is directly performed on the current to-be-coded image when the bit rates are consistent, to obtain a bitstream output by the base layer and a bitstream output by the enhancement layer that correspond to the current to-be-coded image. When the current coded bit rate is not the same as the set bit rate target value, whether a historical enhanced quantization parameter used by the enhancement layer is a preset minimum value continuously for a preset number of times is determined. When the historical enhanced quantization parameter used by the enhancement layer is the preset minimum value continuously for the preset number of times, a server increases the basic quantization parameter, namely, performs a weighted computation by using a preset enhancement weight, to obtain an adjusted basic quantization parameter. Then the adjusted basic quantization parameter is used as a basic quantization parameter for basic coding on the next frame of video image. When the historical enhanced quantization parameter used by the enhancement layer is not the preset minimum value continuously for the preset number of times, whether the current coded bit rate is less than the set bit rate target value is determined. When the current coded bit rate is less than the set bit rate target value, it indicates that the enhancement layer quantization parameter is set too high. In this case, the enhanced quantization parameter is decreased. When the current coded bit rate is not less than the set bit rate target value, it indicates that the enhancement layer quantization parameter is set too low. In this case, the enhanced quantization parameter is increased. Enhanced coding is performed by using the adjusted enhanced quantization parameter to obtain a bitstream output by the enhancement layer, thereby obtaining a coded bitstream corresponding to the current to-be-coded image.

Figure 13:
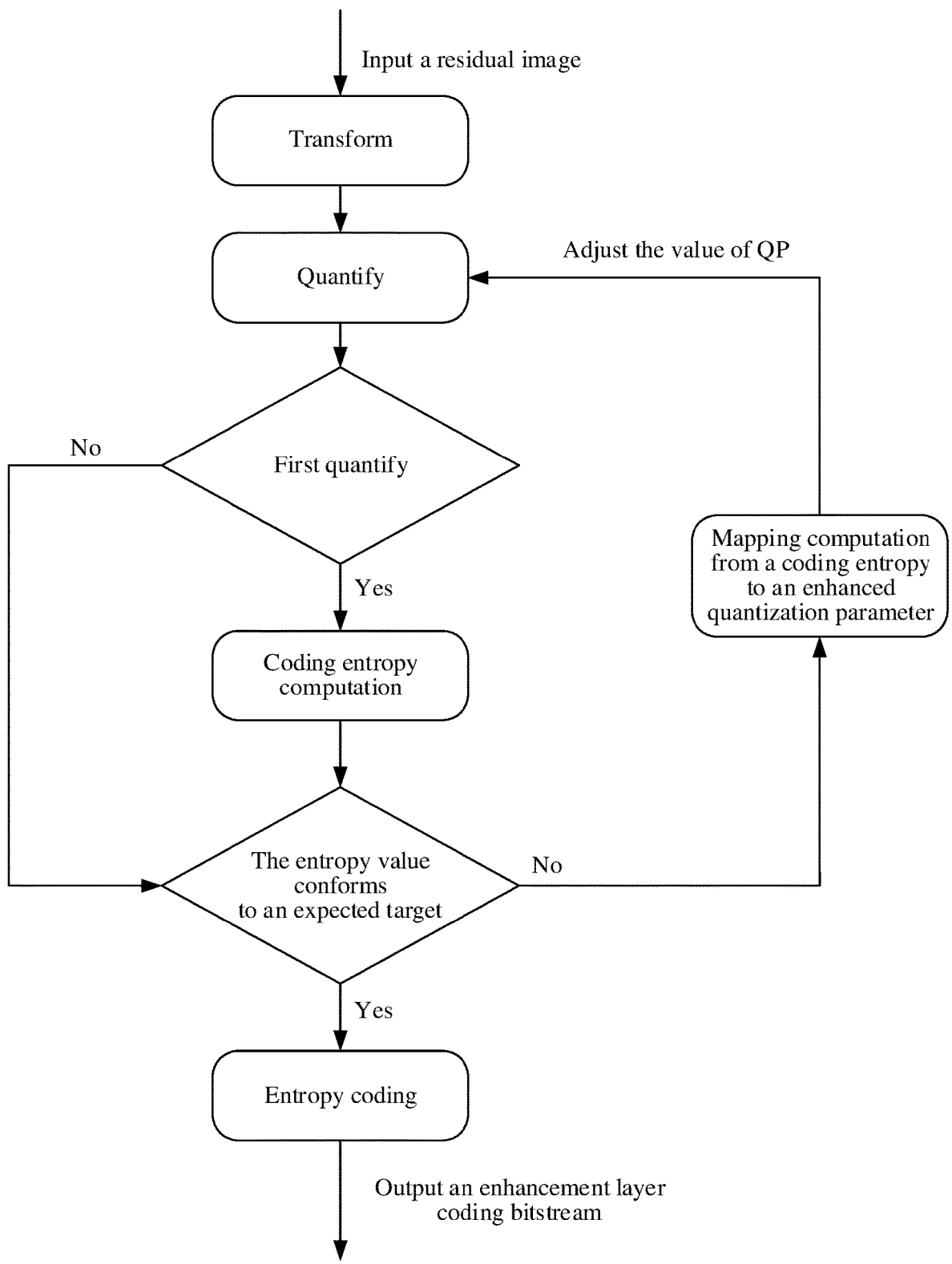
FIG. 13 is a schematic flowchart of controlling an enhancement layer coding bit rate in an embodiment.

In one example embodiment, as shown in FIG. 13, a schematic flowchart of controlling an enhancement layer coding bit rate is provided, specifically: A residual image input to an enhancement layer is obtained, where the residual image may be either a residual image of a first enhancement layer or a residual image of a second enhancement layer. Then, the residual image is transformed in a direction transformation manner to obtain a direction transformed image, and initial mapping is performed according to a basic quantization parameter output by a base layer to obtain an initial enhanced quantization parameter of the enhancement layer. The direction transformed image is quantified by using the initial enhanced quantization parameter to obtain an initial enhanced quantization matrix, and then a coding entropy of the initial enhanced quantization matrix may be computed by using the coding entropy computing method shown in FIG. 7. The coding entropy is mapped according to a preset linear mapping relationship to obtain a magnitude of an initial bitstream, and whether the magnitude of the bitstream conforms to a preset target bit rate of the enhancement layer is determined. If the magnitude of the bitstream conforms to the preset target bit rate of the enhancement layer, entropy coding is performed on the initial enhanced quantization matrix to obtain a bitstream output by the enhancement layer. If the magnitude of the bitstream does not conform to the preset target bit rate of the enhancement layer, the initial enhanced quantization parameter may be adjusted according to the magnitude of the bitstream after the mapping of the coding entropy. When the magnitude of the bitstream after the mapping exceeds the preset target bit rate of the enhancement layer, the initial enhanced quantization parameter is decreased, and when the magnitude of the bitstream after the mapping does not exceed the preset target bit rate of the enhancement layer, the initial enhanced quantization parameter is increased, to obtain an adjusted enhanced quantization parameter. Then, the direction transformed image is quantified by using the adjusted enhanced quantization parameter to obtain an adjusted enhanced quantization matrix. Next, entropy coding is performed on the adjusted enhanced quantization matrix to obtain a coded bitstream output by the enhancement layer.

In one example embodiment, the video coding method and the video decoding method are applied to a video live streaming platform, specifically: A live streaming terminal collects a video through a video capture device, and codes the video by using the video coding method in any of the foregoing embodiments to obtain a bitstream corresponding to the live streaming video. Then, the live streaming terminal transmits the bitstream corresponding to the live streaming video to a video live streaming platform server, and the video live streaming platform server forwards the bitstream corresponding to the live streaming video to a decoding terminal, namely, a terminal watching live streaming, and the terminal watching the live streaming decodes the received bitstream by using the video decoding method in any of the foregoing embodiments to display the live streaming video, thereby improving quality of the displayed live streaming video and enhancing user experience of watching the live streaming. The foregoing video coding method and video decoding method may be widely applied to various video products, such as video watching platforms, video on demand platforms, cloud gaming platforms, and cloud desktop platforms. The coding terminal codes a video and then transmits data, and the decoding terminal decodes a video bitstream to obtain the video and displays the video, thereby improving video coding quality, ensuring decoded video quality, and further enhancing user experience of watching the video. Cloud gaming, also known as gaming on demand, is an online gaming technology based on cloud computing technology. The cloud gaming technology enables a thin client with relatively limited graphics processing and data computing capabilities to run high-quality games. In a cloud gaming scenario, the game is not run in a player's gaming terminal, but in a cloud server, and the cloud server renders the gaming scenario as a video and audio stream and transmits the video and audio stream to the player's gaming terminal through a network. The player's gaming terminal does not need to have strong graphics computing and data processing capabilities, but only need to have basic streaming media playback capabilities and capabilities of obtaining player input instructions and sending the player input instructions to the cloud server.

In one example embodiment, the video coding method and the video decoding method are applied to the field of autonomous driving, that is, in the field of autonomous driving, a captured road video is coded through the video coding method in any of the foregoing embodiments and then transmitted to a server, and the server decodes a video bitstream through the video decoding method in any of the foregoing embodiments to obtain the road video, then recognizes and processes the road video, and guides a vehicle for autonomous driving according to the recognition and processing results, thereby improving accuracy of the autonomous driving.

It is to be understood that, although the steps are displayed sequentially according to the instructions of arrows in the flowcharts of the embodiments described above, these steps are not necessarily performed sequentially according to the sequence instructed by the arrows. Unless otherwise explicitly specified in the present disclosure, execution of the steps is not strictly limited, and the steps may be performed in other sequences. Moreover, at least some of the steps in the flowchart of each embodiment may include a plurality of steps or a plurality of stages. The steps or stages are not necessarily performed at the same time, but may be performed at different time. Execution of the steps or stages is not necessarily sequentially performed, but may be performed alternately with other steps or at least some of steps or stages of other steps.

Based on the same inventive concept, an embodiment of the present disclosure further provides a video coding apparatus for implementing the foregoing video coding method or a video decoding apparatus implementing the foregoing video decoding method. An implementation solution provided by the apparatus to solve problems is similar to that described in the foregoing method. Therefore, specific definitions in one or more embodiments of the video coding or video decoding apparatus provided below may be referred to the definitions on the foregoing video coding or video decoding method, and will not be repeated here.

Figure 14:
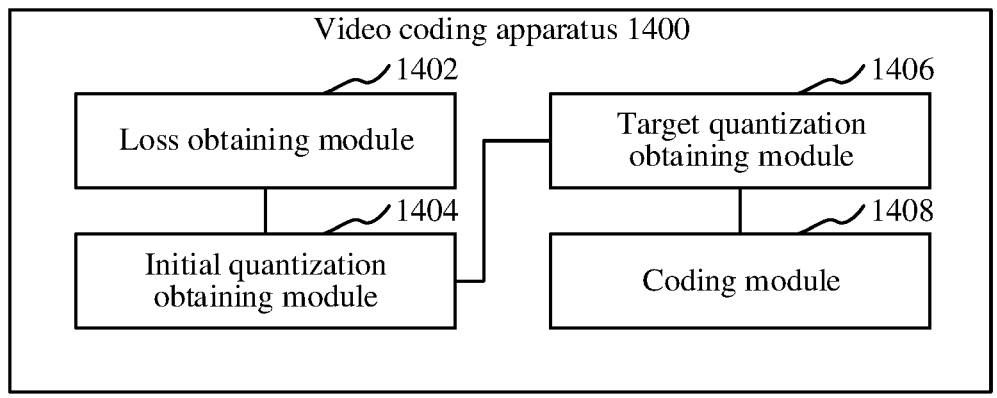
FIG. 14 is a structural block diagram of a video coding apparatus in an embodiment.

In an embodiment, as shown in FIG. 14, a video coding apparatus 1400 is provided, including: a loss obtaining module 1402, an initial quantization obtaining module 1404, a target quantization obtaining module 1406, and a coding module 1408.

The loss obtaining module 1402 is configured to obtain basic coding information and a basic quantization parameter corresponding to a current to-be-coded image in a video, reconstruct the basic coding information to obtain a reconstructed image, and compute a loss between the reconstructed image and the current to-be-coded image to obtain loss information;

the initial quantization obtaining module 1404 is configured to perform initial enhanced quantization mapping on the basic quantization parameter to obtain an initial enhanced quantization parameter, and quantify the loss information by using the initial enhanced quantization parameter to obtain initial enhanced quantization information;

the target quantization obtaining module 1406 is configured to perform a bit rate computation based on the initial enhanced quantization information to obtain an initial enhanced bit rate corresponding to the current to-be-coded image, and adjust the initial enhanced quantization parameter when there is a difference between the initial enhanced bit rate and a preset target enhanced bit rate, to obtain a target enhanced quantization parameter; and the coding module 1408 is configured to code the loss information based on the target enhanced quantization parameter to obtain target enhanced coding information, and obtain target coding information corresponding to the current to-be-coded image based on the basic coding information and the target enhanced coding information.

In an embodiment, the initial quantization obtaining module 1404 is further configured to perform the initial enhanced quantization mapping on the basic quantization parameter to obtain the initial enhanced quantization parameter; and obtain a coded target bit rate corresponding to coded images in the video, and obtain a coded enhanced quantization parameter corresponding to the coded images in the video when the coded target bit rate is not the same as a preset total bit rate; or update the initial enhanced quantization parameter to obtain an updated enhanced quantization parameter when the coded enhanced quantization parameter satisfies a preset enhanced quantization parameter adjustment condition, and quantify the loss information by using the updated enhanced quantization parameter to obtain updated enhanced quantization information.

In an embodiment, the initial quantization obtaining module 1404 is further configured to compare the coded target bit rate with the preset total bit rate when the coded enhanced quantization parameter satisfies the preset enhanced quantization parameter adjustment condition; and update the initial enhanced quantization parameter by using a preset enhancement weight to obtain a first updated enhanced quantization parameter when the coded target bit rate exceeds the preset total bit rate; or update the initial enhanced quantization parameter by using a preset weakening weight to obtain a second updated enhanced quantization parameter when the coded target bit rate does not exceed the preset total bit rate.

In an embodiment, the coding apparatus 1400 further includes:

a basic parameter update module, configured to update the basic quantization parameter to obtain an updated basic quantization parameter when the coded enhanced quantization parameter does not satisfy the preset enhanced quantization parameter adjustment condition; and use the updated basic quantization parameter as a basic quantization parameter for an adjacent to-be-coded image corresponding to the current to-be-coded image.

In an embodiment, the target quantization obtaining module 1406 is further configured to compute coding entropy information corresponding to the initial enhanced quantization information; perform bit rate mapping on the coding entropy information according to a preset bit rate mapping relationship to obtain the initial enhanced bit rate; and update the initial enhanced quantization parameter by using a preset enhancement weight to obtain a first target enhanced quantization parameter when the initial enhanced bit rate exceeds the preset target enhanced bit rate; or update the initial enhanced quantization parameter by using a preset weakening weight to obtain a second target enhanced quantization parameter when the initial enhanced bit rate does not exceed the preset target enhanced bit rate.

In an embodiment, the target quantization obtaining module 1406 is further configured to obtain an initial coding entropy value, and obtain a current quantization value and an adjacent quantization value corresponding to the current quantization value from the initial enhanced quantization information; update the initial coding entropy value based on the current quantization value and the adjacent quantization value to obtain an updated coding entropy value; and use the updated coding entropy value as an initial coding entropy, use the adjacent quantization value as the current quantization value, and return to the step of obtaining an adjacent quantization value corresponding to the current quantization value from the initial enhanced quantization information until quantization values in the initial enhanced quantization information are traversed, to obtain the coding entropy information corresponding to the initial enhanced quantization information.

In an embodiment, the target quantization obtaining module 1406 is further configured to auto-increase the initial coding entropy value to obtain the updated coding entropy value when the current quantization value and the adjacent quantization value are different; or use the initial coding entropy value as an updated coding entropy value when the current quantization value and the adjacent quantization value are the same.

In an embodiment, the coding apparatus 1400 further includes:

an initial coding module, configured to perform entropy coding based on the initial enhanced quantization information to obtain current enhanced coding information when there is no difference between the initial enhanced bit rate and the preset target enhanced bit rate.

The coding module 1408 is further configured to obtain current coding information corresponding to the current to-be-coded image based on the basic coding information and the current enhanced coding information.

In an embodiment, the loss obtaining module 1402 is further configured to perform initial down-sampling on the current to-be-coded image to obtain an initial down-sampled image, and perform secondary down-sampling on the initial down-sampled image to obtain a target down-sampled image; perform basic coding on the target down-sampled image by using the basic quantization parameter to obtain the basic coding information, and reconstruct the basic coding information to obtain the reconstructed image; perform initial up-sampling based on the reconstructed image to obtain an initial up-sampled image, and compute an error between the initial up-sampled image and the initial down-sampled image to obtain first residual information; and use the first residual information as the loss information corresponding to the current to-be-coded image.

In an embodiment, the loss obtaining module 1402 is further configured to up-sample based on the initial up-sampled image to obtain a target up-sampled image, and compute an error between the target up-sampled image and the current to-be-coded image to obtain second residual information; and use the second residual information as loss information corresponding to the current to-be-coded image.

In an embodiment, the coding apparatus 1400 further includes:

a starting coding module, configured to obtain the preset total bit rate, and determine a preset target basic bit rate and a preset target enhanced bit rate based on the preset total bit rate; obtain a starting to-be-coded image corresponding to a preset starting time period in the video, and perform basic coding on the starting to-be-coded image based on the preset target basic bit rate to obtain starting basic coding information; reconstruct the starting basic coding information to obtain a starting reconstructed image, and perform enhanced coding based on the starting reconstructed image by using the preset target enhanced bit rate to obtain starting enhanced coding information; and obtain starting coding information corresponding to the starting to-be-coded image based on the starting basic coding information and the starting enhanced coding information.

Figure 15:
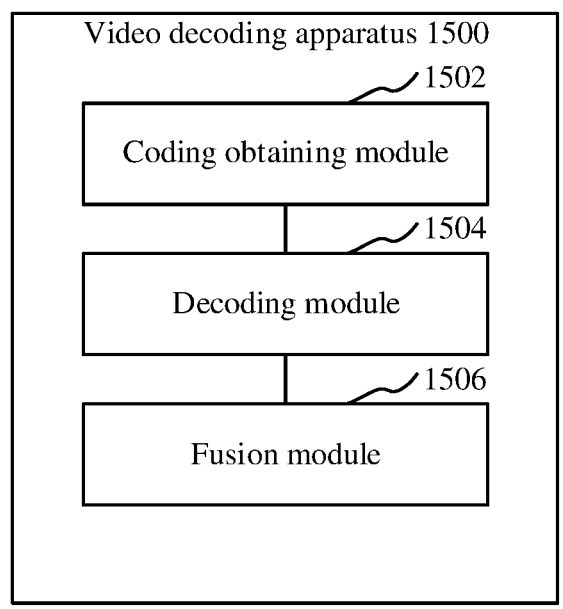
FIG. 15 is a structural block diagram of a video decoding apparatus in an embodiment.

In an embodiment, as shown in FIG. 15, a video decoding apparatus 1500 is provided, including: a coding obtaining module 1502, a decoding module 1504, and a fusion module 1506.

The coding obtaining module 1502 is configured to obtain target coding information corresponding to a current coded image in a video, the target coding information including basic coding information and target enhanced coding information, where the basic coding information is obtained by coding the current coded image using a basic quantization parameter, the target enhanced coding information is obtained by coding loss information based on a target enhanced quantization parameter, the loss information is obtained by reconstructing the basic coding information to obtain a reconstructed image and computing a loss between the reconstructed image and a current to-be-coded image, the target enhanced quantization parameter is obtained by adjusting an initial enhanced quantization parameter when there is a difference between an initial enhanced bit rate and a preset target enhanced bit rate, and the initial enhanced bit rate is obtained by performing initial enhanced quantization mapping on the basic quantization parameter to obtain the initial enhanced quantization parameter, quantifying the loss information by using the initial enhanced quantization parameter to obtain initial enhanced quantization information, and performing a bit rate computation based on the initial enhanced quantization information.

The decoding module 1504 is configured to perform basic decoding on the basic coding information to obtain a basic decoded image, and perform enhanced decoding on the target enhanced coding information to obtain an enhanced decoded image.

The fusion module 1506 is configured to fuse the basic decoded image and the enhanced decoded image to obtain the current coded image in the video.

Each module in the foregoing video decoding apparatus or video coding apparatus may be implemented entirely or partially through software, hardware, or a combination thereof. The foregoing modules may be embedded in or independent of a processor in a computer device in a form of hardware, or stored in a memory of a computer device in a form of software, so that the processor calls the modules to perform operations corresponding to the modules.

Figure 16:
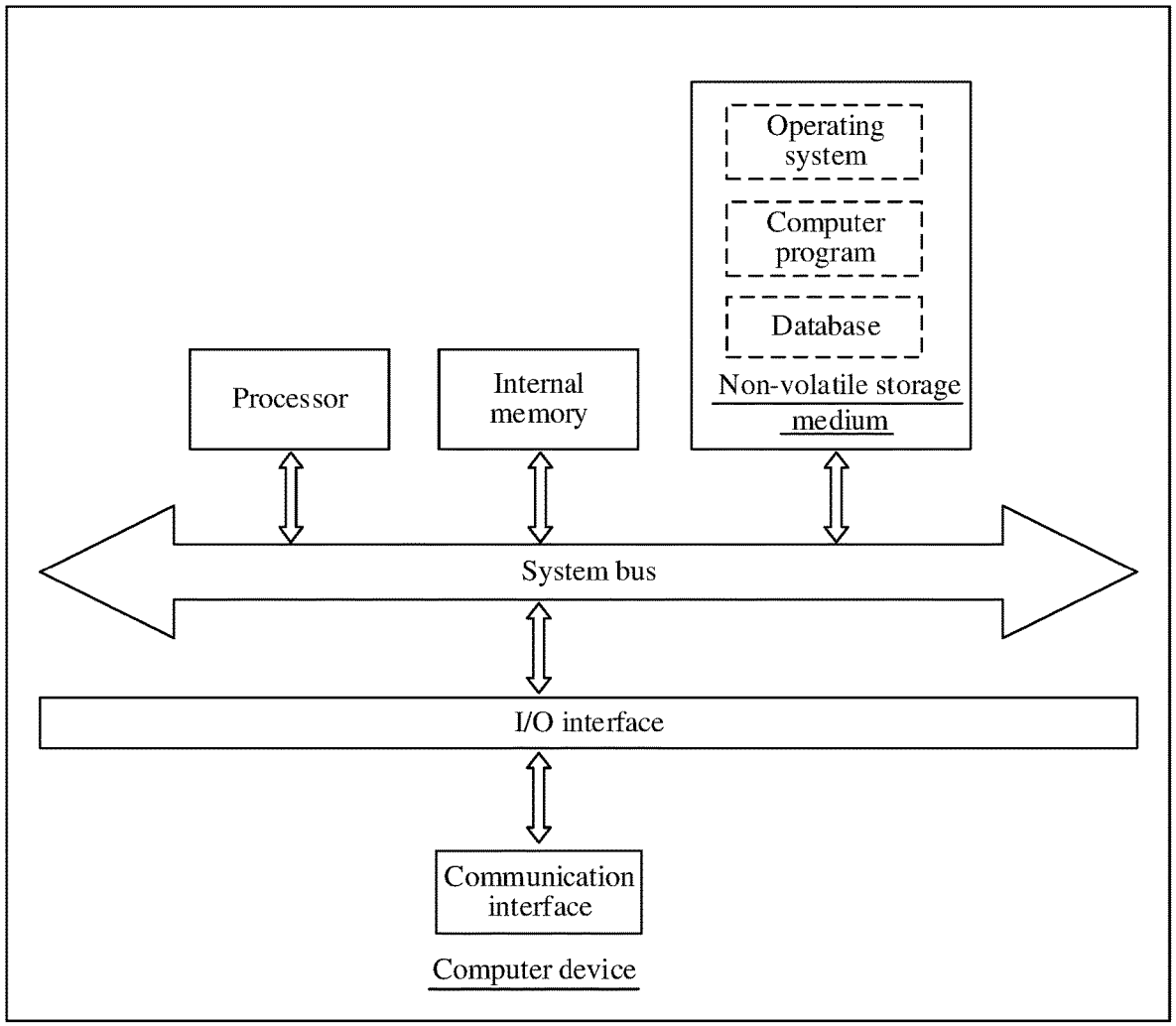
FIG. 16 is a diagram of an internal structure of a computer device in an embodiment.

In an embodiment, a computer device is provided, the computer device may be a server, and an internal structure of the computer device may be shown as FIG. 16. The computer device includes a processor, a memory, and a network interface that are connected through a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for running the operating system and the computer program in the non-volatile storage medium. The database of the computer device is configured to store video data or video bitstream data. The network interface of the computer device is configured to communicate with an external terminal through a network connection. When the computer program is performed by the processor, the video coding method or the video decoding method is implemented.

Figure 17:
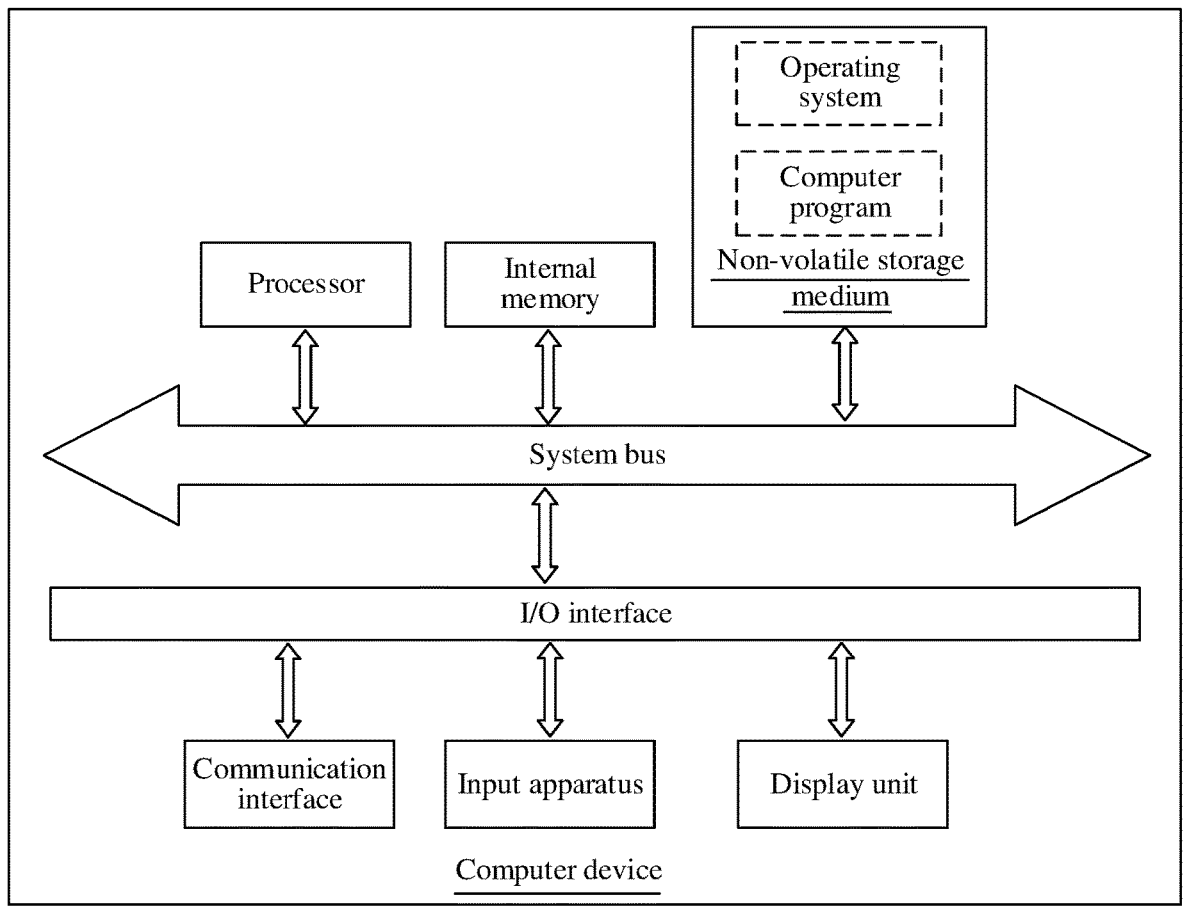
FIG. 17 is a diagram of an internal structure of a computer device in another embodiment.

In an embodiment, a computer device is provided, the computer device may be a terminal, and an internal structure of the computer device may be shown as FIG. 17. The computer device includes a processor, a memory, a network interface, a display, and an input apparatus that are connected through a system bus. The processor of the computer device is configured to provide computing and control capabilities. The memory of the computer device includes a non-volatile storage medium and an internal memory. The non-volatile storage medium stores an operating system and a computer program. The internal memory provides an environment for running the operating system and the computer program in the non-volatile storage medium. The communication interface of this computer device is configured to communicate with an external terminal in a wired or wireless manner, and the wireless manner may be implemented through WIFI, a mobile cellular network, NFC (Near Field Communication), or other technologies. When the computer program is performed by the processor, the video coding method or the video decoding method is implemented. The display of the computer device may be a liquid crystal display or an electronic ink display. The input apparatus of the computer device may be a touch layer covering the display, or may be a button, a trackball, or a touchpad disposed on a housing of the computer device, or may be an external keyboard, an external touchpad, a mouse, or the like.

A person skilled in the art may understand that, the structure shown in FIG. 16 or 17 is merely a block diagram of a partial structure related to a solution in the present disclosure, and does not constitute a limitation to the computer device to which the solution in the present disclosure is applied. In some embodiments, the computer device may include more or fewer components than those shown in the figure, or have some combined components, or have a different component deployment.

In an embodiment, a computer device is further provided, including a memory and a processor, the memory storing a computer program, and the steps in each of the foregoing method embodiments being implemented when the processor performs the computer program.

In an embodiment, a computer-readable storage medium storing a computer program is provided, the steps in each of the foregoing method embodiments being implemented when the computer program is performed by a processor.

In an embodiment, a computer program product or a computer program is provided, the computer program product or the computer program including computer instructions, and the computer instructions being stored in a computer-readable storage medium. A processor of a computer device reads the computer instructions from the computer-readable storage medium, the processor performs the computer instructions, and the computer device is enabled to perform the steps in each of the foregoing method embodiments.

User information (including but not limited to user device information, user personal information, and the like) and data (including but not limited to data used for analysis, stored data, displayed data, and the like) involved in the present disclosure are information and data authorized by users or fully authorized by all parties, and the collection, use, and processing of relevant data need to comply with relevant laws, regulations, and standards of relevant countries and regions.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. Any reference to the memory, the database, or other medium used in the embodiments provided in the present disclosure may all include a non-volatile or volatile memory. The non-volatile memory may include a read-only memory (ROM), a magnetic tape, a floppy disk, a flash memory, an optical memory, a high-density embedded non-volatile memory, a resistive random access memory (ReRAM), a magneto-resistive random access memory (MRAM), a ferroelectric random access memory (FRAM), a phase change memory (PCM), a graphene memory, and the like. The volatile memory may be a random access memory (RAM), an external cache, or the like. As an illustration and not a limitation, the RAM can be in many forms, such as a static random access memory (SRAM) or a dynamic random access memory (DRAM). The database involved in each embodiment provided in the present disclosure may include at least one of a relational database and a non-relational database. The non-relational database may include, but is not limited to, a blockchain-based distributed database and the like. The processor involved in each embodiment provided in the present disclosure may be a general-purpose processor, a central processing unit, a graphics processing unit, a digital signal processor, a programmable logic device, a data processing logic device based on quantum computing, and the like, but is not limited to this.

Technical features of the foregoing embodiments may be combined in different manners to form other embodiments. To make description concise, not all possible combinations of the technical features in the foregoing embodiments are described. However, the combinations of these technical features are considered as falling within the scope recorded by this specification provided that no conflict exists.

The foregoing embodiments show only several implementations of the present disclosure and are described in detail, which, however, are not to be construed as a limitation to the patent scope of the present disclosure. For a person of ordinary skill in the art, many transformations and improvements may be made without departing from the idea of the present disclosure. These transformations and improvements fall within the protection scope of the present disclosure. Therefore, the protection scope of the present disclosure is subject to the appended claims.

What is claimed is:

1. A video coding method, performed by a computer device, wherein the method comprises:
    obtaining basic coding information and a basic quantization parameter corresponding to a current image to be coded in a video, reconstructing the basic coding information to obtain a reconstructed image, and computing a loss between the reconstructed image and the current image to obtain loss information;
    performing initial enhanced quantization mapping on the basic quantization parameter to obtain an initial enhanced quantization parameter;
    obtaining a coded target bit rate corresponding to coded images in the video, and obtaining a coded enhanced quantization parameter corresponding to the coded images in the video in response to the coded target bit rate being different from a preset total bit rate;
    comparing the coded target bit rate with the preset total bit rate in response to that the coded enhanced quantization parameter satisfies a preset enhanced quantization parameter adjustment condition;
    updating the initial enhanced quantization parameter by: using a preset enhancement weight to obtain an updated enhanced quantization parameter in response to the coded target bit rate exceeding the preset total bit rate, or using a preset weakening weight to obtain the updated enhanced quantization parameter in response to the coded target bit rate not exceeding the preset total bit rate;
    quantifying the loss information by using the initial updated enhanced quantization parameter to obtain initial enhanced quantization information;
    performing a bit rate computation based on the initial enhanced quantization information to obtain an initial enhanced bit rate corresponding to the current image, and adjusting the initial enhanced quantization parameter in response to that there is a difference between the initial enhanced bit rate and a preset target enhanced bit rate, to obtain a target enhanced quantization parameter; and
    coding the loss information based on the target enhanced quantization parameter to obtain target enhanced coding information, and obtaining target coding information corresponding to the current image based on the basic coding information and the target enhanced coding information.

2. The method according to claim 1, wherein the method further comprises:
    updating the basic quantization parameter to obtain an updated basic quantization parameter in response to that the coded enhanced quantization parameter does not satisfy the preset enhanced quantization parameter adjustment condition; and
    using the updated basic quantization parameter as a basic quantization parameter for an adjacent image to be coded corresponding to the current image.

3. The method according to claim 1, wherein the performing a bit rate computation based on the initial enhanced quantization information to obtain an initial enhanced bit rate corresponding to the current image, and adjusting the initial enhanced quantization parameter in response to that there is a difference between the initial enhanced bit rate and a preset target enhanced bit rate, to obtain a target enhanced quantization parameter comprises:
    computing coding entropy information corresponding to the initial enhanced quantization information;
    performing bit rate mapping on the coding entropy information according to a preset bit rate mapping relationship to obtain the initial enhanced bit rate;
    updating the initial enhanced quantization parameter by using a preset enhancement weight to obtain a first target enhanced quantization parameter in response to that the initial enhanced bit rate exceeds the preset target enhanced bit rate; and
    updating the initial enhanced quantization parameter by using a preset weakening weight to obtain a second target enhanced quantization parameter in response to that the initial enhanced bit rate does not exceed the preset target enhanced bit rate.

4. The method according to claim 3, wherein the computing coding entropy information corresponding to the initial enhanced quantization information comprises:
    obtaining an initial coding entropy value, and obtaining a current quantization value and an adjacent quantization value corresponding to the current quantization value from the initial enhanced quantization information;

updating the initial coding entropy value based on the current quantization value and the adjacent quantization value to obtain an updated coding entropy value; and using the updated coding entropy value as an initial coding entropy value, using the adjacent quantization value as the current quantization value, and returning to the step of obtaining an adjacent quantization value corresponding to the current quantization value from the initial enhanced quantization information until quantization values in the initial enhanced quantization information are traversed, to obtain the coding entropy information corresponding to the initial enhanced quantization information.

5. The method according to claim 4, wherein the updating the initial coding entropy value based on the current quantization value and the adjacent quantization value to obtain an updated coding entropy value comprises:

auto-increasing the initial coding entropy value to obtain the updated coding entropy value in response to that the current quantization value and the adjacent quantization value are different; and using the initial coding entropy value as the updated coding entropy value in response to that the current quantization value and the adjacent quantization value are the same.

6. The method according to claim 1, wherein the method further comprises:

performing entropy coding based on the initial enhanced quantization information to obtain current enhanced coding information in response to that there is no difference between the initial enhanced bit rate and the preset target enhanced bit rate; and the obtaining target coding information corresponding to the current image based on the basic coding information and the target enhanced coding information comprises:

obtaining current coding information corresponding to the current image based on the basic coding information and the current enhanced coding information.

7. The method according to claim 1, wherein the obtaining basic coding information and a basic quantization parameter corresponding to a current image in a video, reconstructing the basic coding information to obtain a reconstructed image, and computing a loss between the reconstructed image and the current image to obtain loss information comprises:

performing initial down-sampling on the current image to obtain an initial down-sampled image, and performing secondary down-sampling on the initial down-sampled image to obtain a target down-sampled image;

performing basic coding on the target down-sampled image by using the basic quantization parameter to obtain the basic coding information, and reconstructing the basic coding information to obtain the reconstructed image;

performing initial up-sampling based on the reconstructed image to obtain an initial up-sampled image, and computing an error between the initial up-sampled image and the initial down-sampled image to obtain first residual information; and using the first residual information as the loss information corresponding to the current image.

8. The method according to claim 7, wherein the using the first residual information as the loss information corresponding to the current image comprises:

up-sampling based on the initial up-sampled image to obtain a target up-sampled image, and computing an error between the target up-sampled image and the current image to obtain second residual information; and using the second residual information as the loss information corresponding to the current image.

9. The method according to claim 7, further comprising:

obtaining the preset total bit rate, and determining a preset target basic bit rate and a preset target enhanced bit rate based on the preset total bit rate;

obtaining a starting image to be coded corresponding to a preset starting time period in the video, and performing basic coding on the starting image based on the preset target basic bit rate to obtain starting basic coding information;

reconstructing the starting basic coding information to obtain a starting reconstructed image, and performing enhanced coding based on the starting reconstructed image by using the preset target enhanced bit rate to obtain starting enhanced coding information; and obtaining starting coding information corresponding to the starting image based on the starting basic coding information and the starting enhanced coding information.

10. A video coding apparatus, comprising:

at least one memory and at least one processor, the at least one memory storing a computer program, wherein the at least one processor is configured, when executing the computer program, to:

obtain basic coding information and a basic quantization parameter corresponding to a current image in a video, reconstruct the basic coding information to obtain a reconstructed image, and compute a loss between the reconstructed image and the current image to obtain loss information;

perform initial enhanced quantization mapping on the basic quantization parameter to obtain an initial enhanced quantization parameter;

obtain a coded target bit rate corresponding to coded images in the video, and obtaining a coded enhanced quantization parameter corresponding to the coded images in the video in response to the coded target bit rate being different from a preset total bit rate;

compare the coded target bit rate with the preset total bit rate in response to that the coded enhanced quantization parameter satisfies a preset enhanced quantization parameter adjustment condition;

update the initial enhanced quantization parameter by: using a preset enhancement weight to obtain an updated enhanced quantization parameter in response to the coded target bit rate exceeding the preset total bit rate, or using a preset weakening weight to obtain the updated enhanced quantization parameter in response to the coded target bit rate not exceeding the preset total bit rate;

quantify the loss information by using the initial enhanced quantization parameter to obtain initial enhanced quantization information;

perform a bit rate computation based on the updated enhanced quantization information to obtain an initial enhanced bit rate corresponding to the current image, and adjust the initial enhanced quantization parameter in response to that there is a difference between the initial enhanced bit rate and a preset target enhanced bit rate, to obtain a target enhanced quantization parameter; and code the loss information based on the target enhanced quantization parameter to obtain target enhanced coding information, and obtain target coding information corresponding to the current image based on the basic coding information and the target enhanced coding information.

11. The apparatus according to claim 10, wherein the at least one processor is further configured to:
update the basic quantization parameter to obtain an updated basic quantization parameter in response to that the coded enhanced quantization parameter does not satisfy the preset enhanced quantization parameter adjustment condition; and
use the updated basic quantization parameter as a basic quantization parameter for an adjacent image corresponding to the current image.

12. The apparatus according to claim 10, wherein the at least one processor is further configured to is further configured to:
compute coding entropy information corresponding to the initial enhanced quantization information;
perform bit rate mapping on the coding entropy information according to a preset bit rate mapping relationship to obtain the initial enhanced bit rate;
update the initial enhanced quantization parameter by using a preset enhancement weight to obtain a first target enhanced quantization parameter in response to that the initial enhanced bit rate exceeds the preset target enhanced bit rate; and
update the initial enhanced quantization parameter by using a preset weakening weight to obtain a second target enhanced quantization parameter in response to that the initial enhanced bit rate does not exceed the preset target enhanced bit rate.

13. The apparatus according to claim 12, wherein the at least one processor is further configured to is further configured to:
obtain an initial coding entropy value, and obtain a current quantization value and an adjacent quantization value corresponding to the current quantization value from the initial enhanced quantization information;
update the initial coding entropy value based on the current quantization value and the adjacent quantization value to obtain an updated coding entropy value; and
use the updated coding entropy value as an initial coding entropy value, use the adjacent quantization value as the current quantization value, and return to the step of obtaining an adjacent quantization value corresponding to the current quantization value from the initial enhanced quantization information until quantization values in the initial enhanced quantization information are traversed, to obtain the coding entropy information corresponding to the initial enhanced quantization information.

14. The apparatus according to claim 13, wherein the at least one processor is further configured to is further configured to:
auto-increase the initial coding entropy value to obtain the updated coding entropy value in response to that the current quantization value and the adjacent quantization value are different; and use the initial coding entropy value as an updated coding entropy value in response to that the current quantization value and the adjacent quantization value are the same.

15. The apparatus according to claim 10, wherein the at least one processor is further configured to is further configured to:
perform entropy coding based on the initial enhanced quantization information to obtain current enhanced coding information in response to that there is no difference between the initial enhanced bit rate and the preset target enhanced bit rate; and
obtain current coding information corresponding to the current image based on the basic coding information and the current enhanced coding information.

16. A non-transitory computer-readable storage medium, storing a computer program, wherein the computer program, when executed by at least one processor, causing the at least one processor to perform:
obtaining basic coding information and a basic quantization parameter corresponding to a current image to be coded in a video, reconstructing the basic coding information to obtain a reconstructed image, and computing a loss between the reconstructed image and the current image to obtain loss information;
performing initial enhanced quantization mapping on the basic quantization parameter to obtain an initial enhanced quantization parameter;
obtaining a coded target bit rate corresponding to coded images in the video, and obtaining a coded enhanced quantization parameter corresponding to the coded images in the video in response to the coded target bit rate being different from a preset total bit rate;
comparing the coded target bit rate with the preset total bit rate in response to that the coded enhanced quantization parameter satisfies a preset enhanced quantization parameter adjustment condition;
updating the initial enhanced quantization parameter by:
using a preset enhancement weight to obtain an updated enhanced quantization parameter in response to the coded target bit rate exceeding the preset total bit rate, or using a preset weakening weight to obtain the updated enhanced quantization parameter in response to the coded target bit rate not exceeding the preset total bit rate;
quantifying the loss information by using the updated enhanced quantization parameter to obtain initial enhanced quantization information;
performing a bit rate computation based on the initial enhanced quantization information to obtain an initial enhanced bit rate corresponding to the current image, and adjusting the initial enhanced quantization parameter in response to that there is a difference between the initial enhanced bit rate and a preset target enhanced bit rate, to obtain a target enhanced quantization parameter; and
coding the loss information based on the target enhanced quantization parameter to obtain target enhanced coding information, and obtaining target coding information corresponding to the current image based on the basic coding information and the target enhanced coding information.

* * * * *